(12) United States Patent
Alexander et al.

(10) Patent No.: US 7,424,036 B1
(45) Date of Patent: Sep. 9, 2008

(54) EFFICIENT VIRTUAL CONCATENATION DATAPATH FOR SONET/SDH

(75) Inventors: Thomas Alexander, Mulino, OR (US); David Wong, Vancouver (CA); James Whitney Kimbrow, West Linn, OR (US)

(73) Assignee: PMC-Sierra, Inc., Santa Clara, CA (US)

( * ) Notice: Subject to any disclaimer, the term of this patent is extended or adjusted under 35 U.S.C. 154(b) by 1202 days.

(21) Appl. No.: 10/227,453

(22) Filed: Aug. 26, 2002

(51) Int. Cl.
*H04J 3/24* (2006.01)

(52) U.S. Cl. ................................ 370/474; 370/476
(58) Field of Classification Search .......... None
See application file for complete search history.

(56) References Cited

U.S. PATENT DOCUMENTS

| | | | |
|---|---|---|---|
| 6,147,968 A | 11/2000 | De Moer et al. | |
| 6,160,819 A | 12/2000 | Partridge et al. | |
| 6,556,593 B1 * | 4/2003 | Herkersdorf et al. | 370/532 |
| 6,965,619 B2 * | 11/2005 | Bisson et al. | 370/543 |
| 7,079,541 B1 * | 7/2006 | Loussouarn et al. | 370/395.51 |
| 2003/0219019 A1 * | 11/2003 | Wilson | 370/395.1 |
| 2004/0196847 A1 * | 10/2004 | Kuwabara | 370/393 |
| 2005/0141569 A1 * | 6/2005 | Meagher et al. | 370/907 |

OTHER PUBLICATIONS

U.S. Appl. No. 09/812,821, Alexander et al.
U.S. Appl. No. 10/176,230, Alexander et al.

* cited by examiner

*Primary Examiner*—Firmin Backer
*Assistant Examiner*—Rhonda Murphy
(74) *Attorney, Agent, or Firm*—Borden Ladner Gervais LLP

(57) ABSTRACT

The present invention is a SONET payload processing system capable of handling virtual concatenation of SONET payloads. The payload processing system enables combinations of sub-frames, comprising an arbitrary number of virtual concatenation data streams, to be multiplexed into a single SONET frame stream. The present invention further provides a processing system that is not limited by the number of sub-frames or the grouping arrangement. The payload processing system accepts both virtual concatenation and contiguous concatenation within the same SONET frame stream and processes them into blocks of data that do not intermix information from different channels.

32 Claims, 13 Drawing Sheets

FIG. 5

ALIGNMENT RAM OUTPUT
TIMESLOT WITHIN VC GROUP

| 1 | 3 | 2 | 1 | 4 | 3 | 2 | 1 |
|---|---|---|---|---|---|---|---|
| $C_1^1$ | $B_3^1$ | $B_2^1$ | $B_1^1$ | $A_4^1$ | $A_3^1$ | $A_2^1$ | $A_1^1$ |
| $C_1^2$ | $B_3^2$ | $B_2^2$ | $B_1^2$ | $A_4^2$ | $A_3^2$ | $A_2^2$ | $A_1^2$ |
| $C_1^3$ | $B_3^3$ | $B_2^3$ | $B_1^3$ | $A_4^3$ | $A_3^3$ | $A_2^3$ | $A_1^3$ |
| $C_1^4$ | $B_3^4$ | $B_2^4$ | $B_1^4$ | $A_4^4$ | $A_3^4$ | $A_2^4$ | $A_1^4$ |
| $C_1^5$ | $B_3^5$ | $B_2^5$ | $B_1^5$ | $A_4^5$ | $A_3^5$ | $A_2^5$ | $A_1^5$ |
| $C_1^6$ | $B_3^6$ | $B_2^6$ | $B_1^6$ | $A_4^6$ | $A_3^6$ | $A_2^6$ | $A_1^6$ |
| $C_1^7$ | $B_3^7$ | $B_2^7$ | $B_1^7$ | $A_4^7$ | $A_3^7$ | $A_2^7$ | $A_1^7$ |
| $C_1^8$ | $B_3^8$ | $B_2^8$ | $B_1^8$ | $A_4^8$ | $A_3^8$ | $A_2^8$ | $A_1^8$ |

MULTIPLYING SHIFTER OUTPUT
TIMESLOT WITHIN VC GROUP

| 1 | 3 | 2 | 1 | 4 | 3 | 2 | 1 |
|---|---|---|---|---|---|---|---|
| $C_1^1$ | $B_3^1$ | $B_2^1$ | $B_1^1$ | $A_4^1$ | $A_3^1$ | $A_2^1$ | $A_1^1$ |
| $C_1^2$ | $B_3^4$ | $B_2^4$ | $B_1^4$ | $A_4^3$ | $A_3^3$ | $A_2^3$ | $A_1^3$ |
| $C_1^3$ | $B_3^7$ | $B_2^7$ | $B_1^7$ | $A_4^5$ | $A_3^5$ | $A_2^5$ | $A_1^5$ |
| $C_1^4$ | $B_3^2$ | $B_2^2$ | $B_1^2$ | $A_4^7$ | $A_3^7$ | $A_2^7$ | $A_1^7$ |
| $C_1^5$ | $B_3^5$ | $B_2^5$ | $B_1^5$ | $A_4^2$ | $A_3^2$ | $A_2^2$ | $A_1^2$ |
| $C_1^6$ | $B_3^8$ | $B_2^8$ | $B_1^8$ | $A_4^4$ | $A_3^4$ | $A_2^4$ | $A_1^4$ |
| $C_1^7$ | $B_3^3$ | $B_2^3$ | $B_1^3$ | $A_4^6$ | $A_3^6$ | $A_2^6$ | $A_1^6$ |
| $C_1^8$ | $B_3^6$ | $B_2^6$ | $B_1^6$ | $A_4^8$ | $A_3^8$ | $A_2^8$ | $A_1^8$ |

MULTIPLYING SHIFTER OUTPUT
TIMESLOT WITHIN VC GROUP

| 1 | 3 | 2 | 1 | 4 | 3 | 2 | 1 |
|---|---|---|---|---|---|---|---|
| $C_1^1$ | $B_3^1$ | $B_2^1$ | $B_1^1$ | $A_4^1$ | $A_3^1$ | $A_2^1$ | $A_1^1$ |
| $C_1^2$ | $B_3^4$ | $B_2^4$ | $B_1^4$ | $A_4^3$ | $A_3^3$ | $A_2^3$ | $A_1^3$ |
| $C_1^3$ | $B_3^7$ | $B_2^7$ | $B_1^7$ | $A_4^5$ | $A_3^5$ | $A_2^5$ | $A_1^5$ |
| $C_1^4$ | $B_3^2$ | $B_2^2$ | $B_1^2$ | $A_4^7$ | $A_3^7$ | $A_2^7$ | $A_1^7$ |
| $C_1^5$ | $B_3^5$ | $B_2^5$ | $B_1^5$ | $A_4^2$ | $A_3^2$ | $A_2^2$ | $A_1^2$ |
| $C_1^6$ | $B_3^8$ | $B_2^8$ | $B_1^8$ | $A_4^4$ | $A_3^4$ | $A_2^4$ | $A_1^4$ |
| $C_1^7$ | $B_3^3$ | $B_2^3$ | $B_1^3$ | $A_4^6$ | $A_3^6$ | $A_2^6$ | $A_1^6$ |
| $C_1^8$ | $B_3^6$ | $B_2^6$ | $B_1^6$ | $A_4^8$ | $A_3^8$ | $A_2^8$ | $A_1^8$ |

STS INDEX SHIFTER OUTPUT
TIMESLOT WITHIN VC GROUP

| 1 | 3 | 2 | 1 | 4 | 3 | 2 | 1 |
|---|---|---|---|---|---|---|---|
| $C_1^1$ | $B_3^3$ | $B_2^6$ | $B_1^1$ | $A_4^4$ | $A_3^6$ | $A_2^8$ | $A_1^1$ |
| $C_1^2$ | $B_3^6$ | $B_2^1$ | $B_1^4$ | $A_4^6$ | $A_3^8$ | $A_2^1$ | $A_1^3$ |
| $C_1^3$ | $B_3^1$ | $B_2^4$ | $B_1^7$ | $A_4^8$ | $A_3^1$ | $A_2^3$ | $A_1^5$ |
| $C_1^4$ | $B_3^4$ | $B_2^7$ | $B_1^2$ | $A_4^1$ | $A_3^3$ | $A_2^5$ | $A_1^7$ |
| $C_1^5$ | $B_3^7$ | $B_2^2$ | $B_1^5$ | $A_4^3$ | $A_3^5$ | $A_2^7$ | $A_1^2$ |
| $C_1^6$ | $B_3^2$ | $B_2^5$ | $B_1^8$ | $A_4^5$ | $A_3^7$ | $A_2^2$ | $A_1^4$ |
| $C_1^7$ | $B_3^5$ | $B_2^8$ | $B_1^3$ | $A_4^7$ | $A_3^2$ | $A_2^4$ | $A_1^6$ |
| $C_1^8$ | $B_3^8$ | $B_2^3$ | $B_1^6$ | $A_4^2$ | $A_3^4$ | $A_2^6$ | $A_1^8$ |

EFFICIENT VIRTUAL CONCATENATION DATAPATH FOR SONET/SDH

FIELD OF INVENTION

This invention relates to a datapath utilized for processing for virtually concatenated SONET payloads.

BACKGROUND TO THE INVENTION

The Synchronous Optical Network (SONET) was created as the standard fiber optic transmission system for long-distance telephone and data communications. SONET is most commonly described as a high bit-rate fiber-optic-based transport method that provides the foundation for linking high-speed ATM (Asynchronous Transfer Mode) switches and multiplexers and providing users with B-ISDN (Broadband-Integrated Services Digital Network) compliant services. SONET has a very detailed architecture and also contains a series of protocols to implement this architecture. As the architecture is quite complex, this document will only describe those portions of the protocols and frame structure that are useful for explanation purposes.

First, the SONET hierarchy consists of a number of levels, organized according to data transmission speed. Each level has an optical carrier (OC) and an electrical level transmission frame structure, termed the synchronous transport signal (STS). The notation OC-N refers to the nth level of the optical carrier. The counting units are the basic 51.84 Mbps bit rate of OC-1. OC-3, for example, has a bit rate of 155.52 Mbps which is derived from the 3 times multiplier of OC-1. The STS-N notation follows that of the OC-N. For example, an STS-3 frame is sent on an OC-3 fiber link at 155.52 Mbps. The payload, a term commonly referred to, is used to indicate user data within a SONET frame.

The American National Standards Institute (ANSI) T1.105-1995 standard, titled "Synchronous Optical Network (SONET)—Basic Description including Multiplex Structure, Rates and Formats," further elaborates on the SONET frame formats and the data rates previously mentioned.

The basic unit of SONET transmission capacity (51.84 Mb/s) is encompassed by a frame structure consisting of 90 columns and 9 rows (810 bytes), and designated as an STS-1 frame, with each byte in this frame representing a timeslot. The capacity of a SONET optical link is increased by byte-interleaving or multiplexing several basic STS-1 frames to generate larger and larger total information carrying capacity. However, each individual STS-1 frame remains separate from the others within this multiplexing structure and is managed as a separate unit carrying a different information stream from all others. This is satisfactory when the individual streams of information to be transported are less than 51.84 Mb/s in capacity.

In many situations it may be necessary to transport more than 51.84 Mb/s of data information between two end-points as a single stream. SONET networks employ a method called concatenation to increase the capacity allocated to any given data stream or path, but still transport and manage the path as a single unit. Concatenation refers to the process whereby multiple basic STS-1 frames are linked together to create a larger frame that is then transmitted and managed as a unit. Until recently, the only form of concatenation supported was contiguous concatenation, wherein the number of basic frames permitted to be so linked are certain fixed multiples of 3 (3, 12, 48, 192, 768) and the linked frames are required to have a fixed relationship in time to each other when transported over a SONET network. Contiguously concatenated SONET frames are designated as STS-3c, STS-12c, STS-48c, STS-192c and STS-768c, respectively, depending on the number of STS-1 frames that are linked to generate the concatenated frame.

While the restrictions placed upon contiguously concatenated frames greatly simplify the implementation of equipment, it unfortunately also unduly constrains the flexibility afforded to a user in creating and configuring a SONET network, and also impacts the efficiency of the data transfer process. For instance, a popular requirement within a SONET network is to be able to transport Fast Ethernet or Gigabit Ethernet signals. These signals have fixed data rates of 100 Mb/s and 1000 Mb/s respectively. The smallest contiguously concatenated SONET frames that are capable of carrying these signals are STS-3c (155.52 Mb/s) and STS-48c (2488.32 Mb/s), respectively. However, the corresponding resulting transmission efficiencies are only 64% and 40%. This is because the allocated bandwidth of the SONET contiguously concatenated frame greatly exceeds the required bandwidth by the Ethernet signals. In addition, the number of different signals that may be combined together into one link is greatly restricted by this waste of bandwidth due to inflexibility.

A standard for transmission of information over SONET networks calls for the use of virtual concatenation to solve this problem. Virtual concatenation attempts to link together multiple 810-byte STS-1 sub-frames in the same manner as contiguous concatenation, but eliminates all of the restrictions on the number of basic STS-1 sub-frames thus linked as well as the relative placement of these STS-1 sub-frames within the complete SONET frame structure. In addition, the STS-1 sub-frames constituting a virtual concatenation frame are only associated with each other at the end-points; the intervening SONET network is free to route these subframes by different paths if this results in simpler network configuration or better network utilization. The result is that provisioning flexibility and transmission efficiency are greatly increased. In the Fast Ethernet and Gigabit Ethernet examples provided above, the use of virtual concatenation allows a user to link 2 STS-1 sub-frames (103.68 Mb/s) and 20 STS-1 subframes (1036.8 Mb/s), respectively, to carry the Ethernet signals. The resulting efficiencies are 96.5% for both cases, which is a great improvement over the contiguous concatenation case.

Virtual concatenation also permits the linking of several contiguously concatenated frames in place of the basic STS-1 frames if so desired. For instance, an alternative to linking STS-1 sub-frames is to link STS-3c sub-frames to obtain the necessary bandwidth. This is done if a reduction in management and complexity is required, as the number of STS-3c sub-frames that must be linked to yield a particular bandwidth is one-third the number of STS-1 sub-frames for the same equivalent bandwidth. Processing such virtual concatenation frame streams, however, presents a significant challenge for a SONET equipment designer, especially as the data rates increase to 2.5 Gb/s (oC-48) and more. As each STS-1 sub-frame may take a different path from source to destination, a differential delay may exist between the sub-frames constituting a single virtual concatenation frame, and this differential delay must be eliminated by time-shifting the sub-frames arriving at a destination before recombining them. Also, the arbitrary positioning and number of sub-frames comprising a virtual concatenation frame means that complex shifting and combining must be done (after compensating for differential delay, as described). Virtual concatenation also supports means whereby the number of sub-frames assigned to a channel may vary dynamically to account for changing conditions, which renders the construction of sub-frame interleaving and de-interleaving apparatus very difficult. Finally, virtual concatenation does not adhere to the convenient multiples of 4 utilized by contiguous concatenation, resulting in much more complex multiplexing and demultiplexing arrangements.

The presence of an arbitrary, and dynamically varying, number of virtual concatenation frames within a SONET data stream makes the traditional approach to equipment design, which is to use dedicated separate processing units for the different types of concatenated frames, infeasible. A better approach uses some form of time-sliced arrangement, whereby a single SONET payload processor would be combined with some kind of dynamic context switching capability to create the effect of an arbitrary number of different payload processors. A significant issue with the time-sliced approach, however, is that it is difficult to adapt to the problem of handling arbitrary multiplexing ratios. For example, processing a random combination of STS-1 sub-frames with some arbitrary grouping into virtual concatenation streams is difficult to manage, due to the complexity of switching context information at high rates. In addition, the handling of higher-speed SONET data rates (2.488 Gb/s and above) forces the datapaths used to process these frames to be made more than one byte wide, and wide time-sliced datapaths are notoriously difficult to design and configure.

The problem of handling higher-speed SONET data rates has not been commonly encountered to date for two reasons. Firstly, the faster SONET rates have only recently begun to be used, and the problem becomes significant only when these higher rates need to be processed. Secondly, the virtual concatenation procedure is itself very new; the formal description for SONET virtual concatenation, as embodied in American National Standard Institute (ANSI) T1X1.5/2001-062 standard, was published in 2001. The construction of a SONET payload processor suitable for virtual concatenation processing, therefore, is a new area in which little activity has occurred to date.

The prior art has not provided a solution to the virtual concatenation problem. U.S. Pat. No. 6,160,819, issued to Partridge et. al., discloses a form of inverse multiplexing of variable-length packet data over multiple low-speed SONET links that bears some general resemblance to the virtual concatenation technique, but presupposes the existence of a Byte-By-Byte (BBB) "striping unit" that performs the actual splitting and recombining of the data stream, without giving details about its construction. U.S. Pat. No. 6,147,968, issued to De Moer et. al., discloses an apparatus that is capable of splitting a SONET ring into blocks and sub-blocks, but limits itself to the control issues of delineating various sub-blocks within the complete ring using a marking scheme, without any details as to how the component blocks and sub-blocks (representing concatenated payloads) can be constructed and disassembled in an efficient and physically realizable manner.

A co-pending U.S. patent application Ser. No. 10/176,230 filed Jun. 3, 2002, entitled "Efficient Variably-Channelized SONET Multiplexer and Payload Mapper" describes a variably-channelized SONET mapper arrangement that is substantially more efficient at processing contiguously concatenated streams than the prior art at high speeds, but this is also inapplicable to the task of processing virtual concatenated frames due to its multiplexing and demultiplexing in powers of 2 rather than arbitrary combinations.

In view of the above shortcomings, the present invention provides a SONET payload processing system capable of handling virtual concatenation, as well as contiguous concatenation in an efficient and straightforward manner.

SUMMARY OF THE INVENTION

The present invention is a SONET payload processing system capable of handling virtual concatenation of SONET payloads. The payload processing system enables combinations of sub-frames, comprising an arbitrary number of virtual concatenation data streams, to be multiplexed into a single SONET frame stream. The present invention further provides a processing system that is not limited by the number of sub-frames or the grouping arrangement. The payload processing system accepts both virtual concatenation and contiguous concatenation within the same SONET frame stream and processes them into blocks of data that do not intermix information from different channels.

In a preferred embodiment of the present invention, the system eliminates the arbitrary differential delay between the sub-frame streams within each virtual concatenation SONET stream. The present invention further provides an efficient system for processing virtually concatenated data streams and interfacing between a SONET framer and a system-side payload processor.

In a first aspect, the present invention provides an apparatus for mapping discrete data units sequentially located within a mapper input data word onto predetermined discrete data units non-sequentially located within a mapper output data word based on a specific index comprising: input means for accepting the mapper input data word; shifting means for shifting each of the discrete data units located within the mapper input data word by a shift amount, the shift amount being based on the specific index associated with the mapper input data word; and output means for storing a mapper output data word from the shifting means.

In a second aspect, the present invention provides a method of mapping discrete data units sequentially located within a mapper input data word onto predetermined discrete data units non-sequentially located within a mapper output data word based on a specific index, the method including the steps of:

accepting the discrete data units within the mapper input data word;

shifting each of the discrete data units within the mapper input data word by a shift amount, the shift amount being based on the specific index value associated with the mapper input data word accepted in step a); and storing as the mapper output data word the set of discrete data units shifted in step b).

In a third aspect, the present invention provides a method of forming a data frame, each data frame being comprised of a plurality of data sub-frames, each data sub-frame being comprised of a plurality of discrete data units, each data unit being associated with a particular one of a plurality of data streams, the method including the steps of:

receiving the plurality of data streams;

forming the discrete data units comprising the data streams into mapper input data words;

mapping discrete data units sequentially located within a mapper input data word onto predetermined discrete data units non-sequentially located within a mapper output data word based on a specific index;

reordering the mapper output data words according to the data sub-frames in order to form the data frames.

BRIEF DESCRIPTION OF THE DRAWINGS

The present invention will now be described with reference to the drawings, in which:

FIG. 5 illustrates the resultant data matrix from processing the output of the transposition network through the alignment buffer of FIG. 3;

FIG. 6 illustrates the resultant data matrix from processing the output of the alignment buffer through the multiplying shifter and the index shifter of FIG. 3;

FIG. 9 illustrates the resultant data matrix from processing the output of the multiplying shifter and the STS index shifter into the accumulation buffer of FIG. 3;

FIG. 10 illustrates the compensator shifter output as derived from the accumulator buffer contents depicted in FIG. 9;

DETAILED DESCRIPTION

Figure 1:
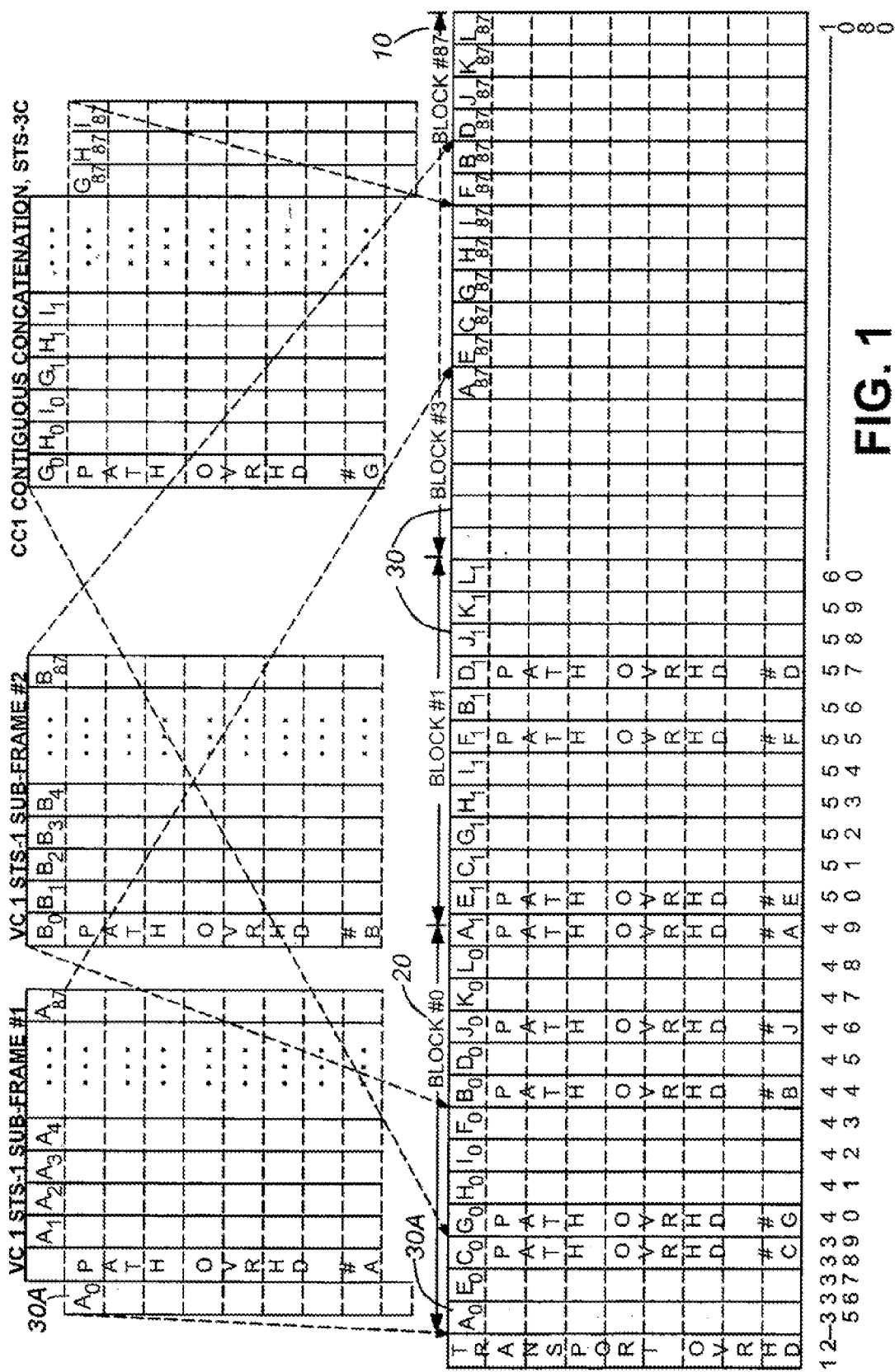
FIG. 1 illustrates an example of a SONET frame containing both contiguously and virtually concatenated sub-frames.

FIG. 1 illustrates an example of a SONET frame 10 containing both contiguously concatenated (CC) and virtually concatenated (VC) sub-frames of data. FIG. 1 represents an OC-12 frame 10 that consists of 3 VC frames and 1 CC frame in 12 timeslots. The 3 VC frames each contain sub-frames. In FIG. 1, the first two sub-frames of the first VC frame are shown. The two first sub-frames are labeled as VC1 STS-1 sub-frame#1, VC1 STS-1 subframe#2, respectively. The first sub-frame, VC1 STS-1 sub-frame#1, has both an overhead portion and a payload portion, 87 columns by 9 rows, as is required by the SONET protocol. The columns of the payload and the overhead portions of the first sub-frame, VC1 STS-1 sub-frame#1, are labeled $A_0, A_1, A_3, \ldots, A_{87}$. The second sub-frame 1, VC1 STS-1 subframe#2, is comprised of columns labeled $B_1, B_2, \ldots, B_{87}$. The first VC frame consists of a third and a fourth sub-frame, not shown in FIG. 1. However, the data columns of the third sub-frame and the fourth sub-frames are illustrated in the OC-12 frame 10, as columns $C_0, C_1, \ldots, C_{87}$, and $D_0, D_1, \ldots, D_{87}$, respectively. The second VC frame consists of two sub-frames (not shown), a first sub-frame having E0, E1, . . . , E87 data columns, and a second sub-frame having F0, F1, . . . , F87 data columns. The third VC frame consists of three sub-frames (not shown), a first sub-frame having J0, J1, . . . , J87 data columns, a second sub-frame having H0, H1, . . . , H87 data columns, and a third sub-frame having I0, I1, . . . , I87 data columns. All of the E, F, J, K, L labeled data columns form part of the OC-12 frame 10. Each VC sub-frame may be assigned any particular time slot. It is not required that the sub-frames of a particular VC frame be positioned in consecutive time slots. Finally, The Contiguous Concatenation STS-3C frame CC1 is further comprised of three sub-frames. The CC1, labeled G0, H0, I0, G1, H1, I1, . . . , G87, H87, I87. It should be mentioned that CC frames may only occupy consecutive timeslots since a CC frame contains only one reference pointer for all of the CC sub-frames.

The structure of the OC-12 frame 10 is further explained in the Table 1 below:

TABLE 1

| | OC-12 SONET Frame | |
|---|---|---|
| Timeslot | Label | Associated with |
| 1 | A | STS-1 sub-frame 1 of virtual concatenated frame 1 |
| 2 | E | STS-1 sub-frame 1 of virtually concatenated frame 2 |
| 3 | C | STS-1 sub-frame 3 of virtually concatenated frame 1 |
| 4 | G | STS-1 sub-frame 1 of contiguously concatenated STS-3c frame |
| 5 | H | STS-1 sub-frame 2 of contiguously concatenated STS-3c frame |
| 6 | I | STS-1 sub-frame 3 of contiguously concatenated STS-3c frame |
| 7 | F | STS-1 sub-frame 2 of virtually concatenated frame 2 |
| 8 | B | STS-1 sub-frame 2 of virtually concatenated frame 1 |
| 9 | D | STS-1 sub-frame 4 of virtually concatenated frame 1 |
| 10 | J | STS-1 sub-frame 1 of virtually concatenated frame 3 (STS-3c) |
| 11 | K | STS-1 sub-frame 2 of virtually concatenated frame 3 (STS-3c) |
| 12 | L | STS-1 sub-frame 3 of virtually concatenated frame 3 (STS-3c) |

In FIG. 1 there are repeating blocks of 12 timeslots, all of which contain the structure highlighted in Table 1. The payload portion of the OC-12 SONET frame 10 is comprised of 88 blocks, where each block is 12 bytes in data width. Block 20 is 12 bytes wide and each 1-byte column 30 in the SONET frame 10 originated from a VC sub-frame, or CC-frame. As illustrated, column 30A consists of one data column $A_0$ of the VC frame STS-1 sub-frame#1. The $A_0$ column is part of the data columns labeled A as defined in Table 1.

The purpose of the present invention is to convert the complex and highly interleaved framing structure as illustrated by FIG. 1 into a non-interleaved and simple stream of data blocks, thereby enabling efficient and simplified processing of the payload data contained within the incoming SONET frame.

Figure 2:
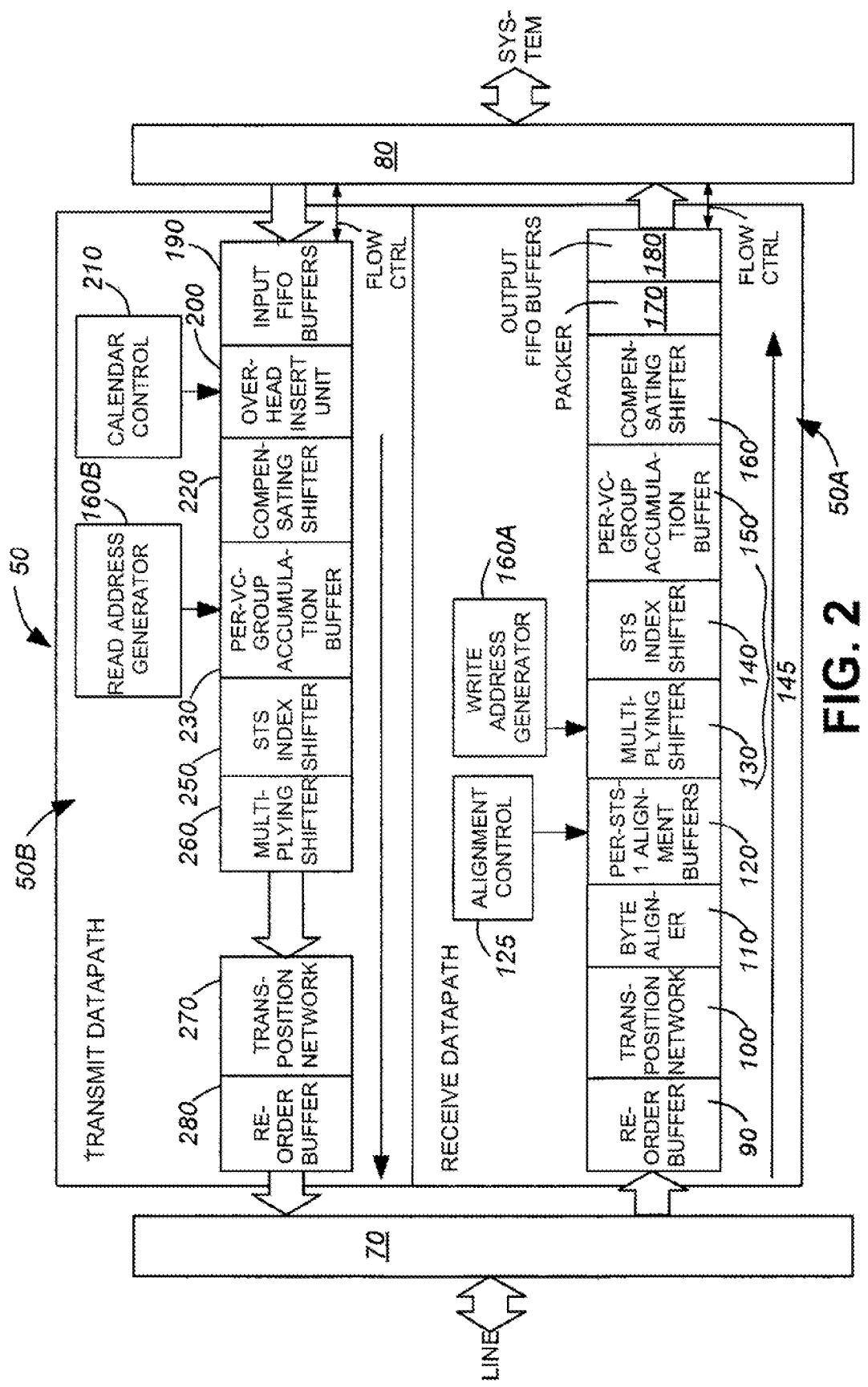
FIG. 2 illustrates a high-level block diagram of the SONET processing system according to a first embodiment of the present invention.

FIG. 2 illustrates a high-level block diagram of the SONET processing system 50 according to a first embodiment of the present invention. The system is illustrated in the receive datapath 50A, as well as the transmit datapath 50B. According to FIG. 1, both the SONET receive and transmit datapaths 50A and 50B are placed between a standard SONET line interface and an overhead processor 70, commonly referred to as a SONET framer, and a system-side frame processor 80. In the receive datapath 50A, the framer is responsible for interfacing with optical elements, synchronizing to the incoming bitstream, delineating the SONET frame, processing the section, line and path overhead of the SONET frame, and, finally, identifying the bytes within the SONET frame that correspond to payload data. The identified payload portion of the SONET frame is sent to the receive datapath 50A. In the transmit datapath 50B, the SONET framer 70 performs the reverse operation, i.e. generating the complete frame and driving the optical elements. The system-side frame processor 80 is required to process the received data within the different frame streams, and is also required to generate the transmitted data that is placed within the outgoing frame streams by the respective datapath. It should be understood to those skilled in the art that both of these elements, the SONET framer 70 and the system-side frame processor 80, are standard elements of SONET physical layer devices and will not be further explained.

In the receive path, a reorder buffer 90 receives data words from the SONET framer 70. The reorder buffer 90 is connected to a transposition network 100. The reorder buffer 90 and the transposition network 100, in combination, accept input data words, rearrange them, apply a transposition function to the rearranged data words by converting the columns of data to rows of data in a fixed repetitive manner, and output them to the remainder of the datapath. A byte aligner 110, coupled with an alignment buffer 120, receives the output from the transposition network 100. Both the byte aligner 110 and the alignment buffer 120, with the associated alignment control 125, shift the data words to compensate for a differential delay between various incoming STS-1 sub-frames. Although not clearly shown in FIG. 2, it is understood that the alignment buffer 120 consists of a group of alignment buffers, one per STS-1 sub-frame being aligned. As an example, there may be a plurality of alignment buffers having STS-1 VC sub-frame buffering capabilities. The delay compensation is only necessary for the virtual concatenation frame stream, and not required for the contiguously concatenated frame stream. A multiplying shifter 130 and an associated STS index shifter 140, coupled to the alignment buffer 120, shuffles and aligns the data words into a particular order to permit them to be organized into an accumulation buffer 150. The multiplying shifter 130 and the associated STS index shifter 140 both form a single functional block known as the mapping means 145.

The accumulation buffer 150 accepts VC sub-frames, which have been rearranged in the mapping means 145, and regroups the VC sub-frames in their respective VC frame streams. The write address generator 160A in the receive datapath, and the read address generator 160B in the transmit datapath, control the writing, or reading, of data words to, or from, the accumulation buffer in the transmit and receive datapaths. A compensating shifter 160, located at the egress side of the accumulation buffer 150, performs a final alignment function on the sub-frames to place them in the required order. The compensating shifter 160 outputs the aligned sub-frames to a packer unit 170. The packer unit 170 removes any gaps of data between VC sub-frames within the streams of SONET frames. Output FIFO (First-In-First-Out) buffers 180 receive a stream of frames from the packer, buffer the streams of sub-frames, VC or CC, and output them to the system-side frame processor 80.

The transmit datapath 50B is essentially a subset of the receive datapath 50A, with fewer functional elements. The operation of the transmit datapath 50B is simpler than that of the receive datapath 50A due to the lack of compensation required for differential delays and pointer adjustments. The transmit datapath 50B consists of input FIFO buffers 190, an overhead insert unit 200, a calendar unit 210, a compensating shifter 220, group accumulator buffers 230, a read address generator 240, an index shifter 250, a multiplying shifter 260, a transposition network 270, and a re-order buffer 280. The overhead insert unit 200, and associated calendar control unit 210, insert overhead bytes on a per sub-frame basis, throughout the entire SONET frame. The operation of the transmit processing datapath 50B is very similar to the receive processing datapath 50A. As such, the receive processing datapath 50A will first be described, followed by an abridged explanation of the transmit processing datapath 50B.

It should be mentioned that all functional block elements in the datapath, excluding the control and address generator portions, are of the same width, which may range, in powers of 2, from a single byte to any number of bytes, 1 to N bytes. The present invention will now be described using a width of 8 bytes, but may be adjusted to other widths as required.

The transposition networks 100, 270 in the transmit and receive datapaths preferably make use of the pipelined Butterfly merge network disclosed in co-pending U.S. application Multi-Stream Merge Network for Data Width Conversion and Multiplexing, Ser. No. 09/812,821 filed Mar. 21, 2001. Although this pipelined Butterfly merge network is utilized herein, it is understood that any suitable network that is capable of performing the required function may be substituted.

Figure 3:
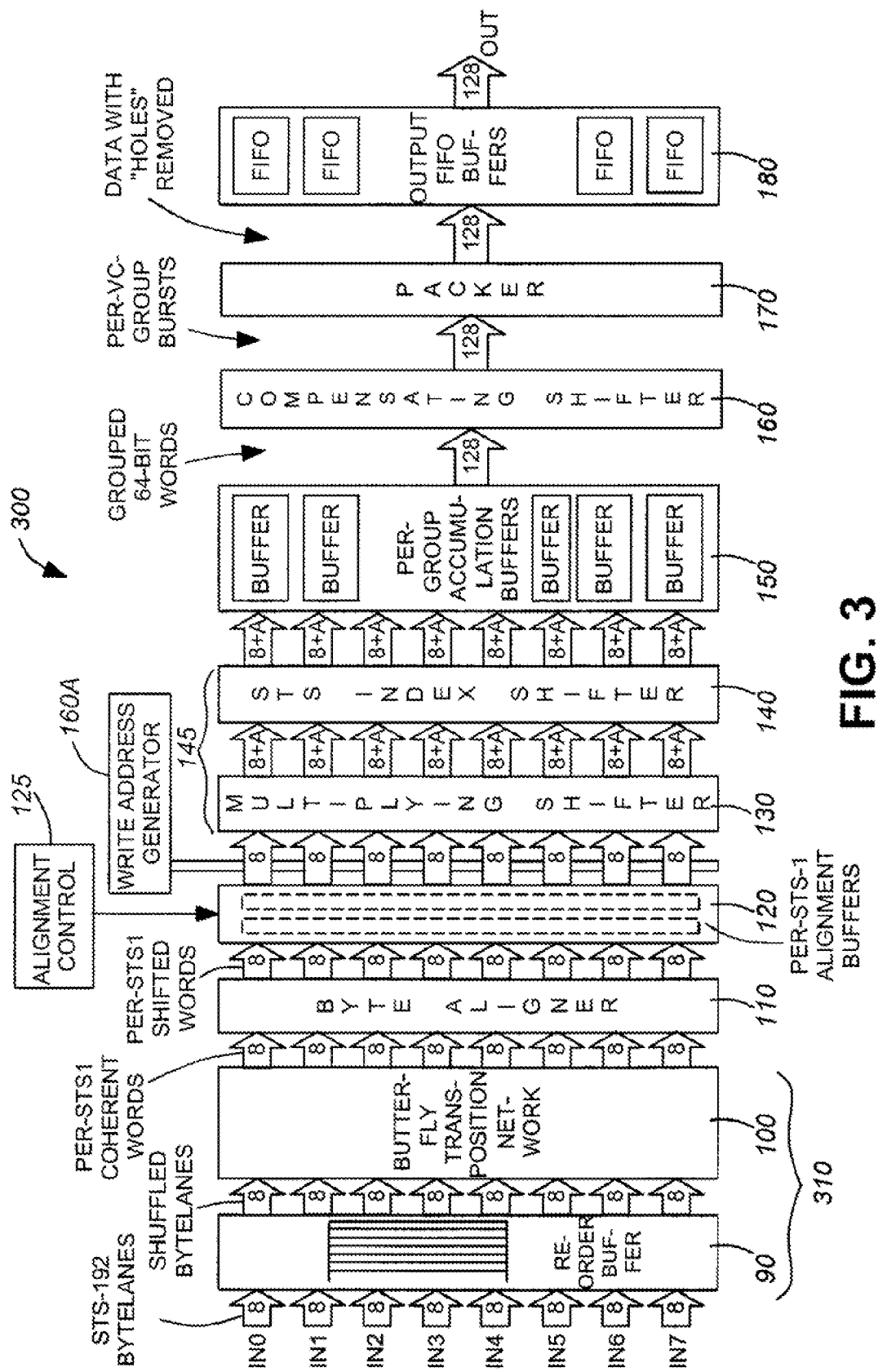
FIG. 3 is a schematic representation of the elements in the receive datapath of FIG. 2.

The receive datapath 300 of FIG. 3 converts between a continuous series of SONET frames, each organized as a collection of sub-frames that may be contiguously concatenated, virtually concatenated, or both, and a set of separate blocks of data, with each block of data containing the payload constructed from a single set of contiguously or virtually concatenated sub-frames. Input to the receive datapath 300 is provided as a sequence of multi-byte words, with each byte of each word representing a particular timeslot in the SONET frame stream. In addition, the receive datapath 300 needs to account for gaps within the received SONET frames (representing overhead bytes that have been processed and deleted by upstream functional elements), and shifts in the payload data with respect to the SONET frame (representing pointer adjustments that have occurred in order to compensate for clock frequency differences). Finally, the receive datapath 300 must take into account and adjust for differential delays among the component sub-frames of a virtually concatenated stream, buffering those sub-frames received early until data from all of the sub-frames are available to be output as a unit.

For example, a SONET frame, at the input of the receive datapath 300, may contain three sub-data streams formed via virtual concatenation from 8 sub-frames. The three VC streams are labeled A, B, and C, and correspondingly, the 8 VC sub-frames are A1, A2, A3, A4, B1, B2, C1. Table 2 below illustrates an exemplary arrangement of VC sub-frames in corresponding SONET frame timeslots.

TABLE 2

| SONET Frame having 8 VC sub-frames | | |
|---|---|---|
| Timeslot | VC stream | Sub-frame |
| 1 | A | Sub-frame A1, differential delay = 0 |
| 2 | B | Sub-frame B1, differential delay = 12 |
| 3 | C | Sub-frame C1, differential delay = 0 |
| 4 | A | Sub-frame A2, differential delay = 5 |
| 5 | B | Sub-frame B2, differential delay = 0 |
| 6 | A | Sub-frame A3, differential delay = 7 |
| 7 | B | Sub-frame B3, differential delay = 0 |
| 8 | A | Sub-frame A4, differential delay = 0 |

In order to process the VC sub-frames, the receive datapath 300 must first time-shift the input data from the sub-frames in timeslots 2, 4, and 6 by the appropriate amount in order to align them with the rest of the timeslots in their corresponding VC sub-frame groupings. The receive datapath 300 then removes empty bytes, resultant from deleted SONET overhead, and finally arranges, packs and outputs data blocks. The output data blocks contain the combined payload from their corresponding VC sub-frames. Therefore, the expected output pattern would consist of a burst of data taken exclusively from sub-frames A1, A2, A3 and A4 (in that order), followed by a burst of data from B1, B2 and B3, and finally a burst of data from C1. The end result is that the system-side frame processor 80 (FIG. 2) does not have to concern itself with the complex organization of the incoming SONET frame, but instead can process coherent and contiguous data from any desired virtual concatenation data stream. Note that the exact reverse operation is performed for the transmit direction.

FIG. 3 is a schematic representation of the elements in a receive datapath 300 of the present invention. The elements of the receive datapath 300 will now be explained, with reference to FIG. 3 in which each element will be described in detail under their respective headings.

Reorder Buffer 90 and Transposition Network 100

Figure 4:
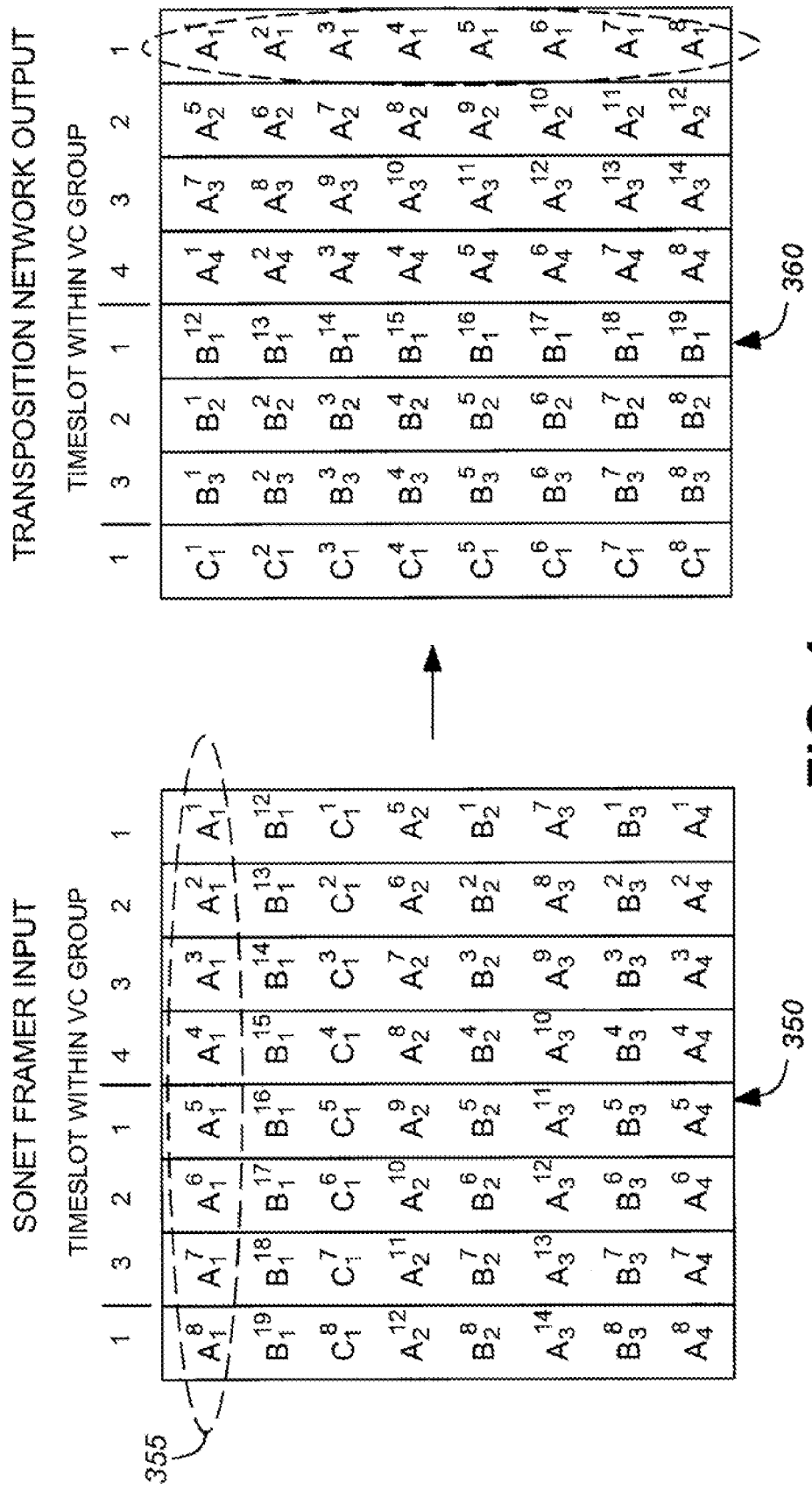
FIG. 4 is an illustration of incoming data bytes and outgoing data bytes with respect to the transposition network of FIG. 3.

In FIG. 3, the reorder buffer 90 and transposition network 100 together comprise a matrix transposition function 310 that serves to convert a stream of incoming data bytes, from the timeslots in the SONET frame, to a series of time-division-multiplexed (TDM) data words. FIG. 4, follows the example of Table 2, where the SONET frame has 3 VC frames, A, B, C. In FIG. 4, the incoming data bytes 350 from the SONET framer are illustrated in a matrix form. As shown in FIG. 4, the combination of the transposition network and reorder buffer remaps all of the incoming bytes 350 arriving on a given byte lane (e.g., $A_1^1$, $A_1^2$, etc.) to a complete data word on the datapath. As such, all $A_I^X$ byte lanes 355 are re-ordered as an A1 data word 360. The transposition is performed across a square block of data of size equal to the datapath width, and then repeats for the next block of data, and so on.

The present invention incorporates herein by reference a co-pending patent application Ser. No. 09/512,821 filed Mar. 21, 2001 entitled "Multi-stream Merge Network for Data Width Conversion and Multiplexing", which describes a pipelined Butterfly network that is capable of efficiently implementing the transposition shown in FIG. 4. It is understood that other transposition means may be capable of performing the transformation described above. When a pipelined Butterfly network 100 is used for the transposition, a reorder buffer 90 is required. The re-order buffer 90 accepts the data presented by the SONET framer 70 (FIG. 2) in serial order and stores it into internal buffer memory means (not shown) in the same order. After storing the data, the re-order buffer 90 reads the data out of the internal buffer memory means in an interleaved order that permits the pipelined Butterfly network to perform its functions properly. The internal buffer memory means used may be any type of random access memory (RAM). The addressing required for the write and read ports for RAM may be summarized as follows:

Write address (linear sequential): A=A+1
Read address (interleaved, block):

For $i$=0 to $(D-1)$

For $j$=0 to $(S/D-1)$ $A_o = A_{base} + (j*(S/D)) + i;$ where $A_I$, is the current write address used for the reorder buffer RAM;
$A_o$ is the current read address used for the reorder buffer RAM;
$A_{base}$ is the starting address of the current block of data in the reorder buffer RAM (e.g., 0 for the first block);
S is the total number of STS-1 sub-frames comprising the SONET frame (e.g., 192 for an STS-192 SONET frame stream);
D is the width of the datapath in bytes (e.g., 8 in this example);
i, j are indices.

The use of $A_{base}$ above allows the reorder buffer 90 to contain a multiplicity of buffers, each of total size S. The utilization of more than one buffer allows a double- or triple-buffering scheme to be used to simplify the constraints on the SONET framer. However, the use of a multiplicity of buffers is not a requirement.

Byte Aligner 110 and Per-STS-1 Alignment Buffers 120

Figure 5:
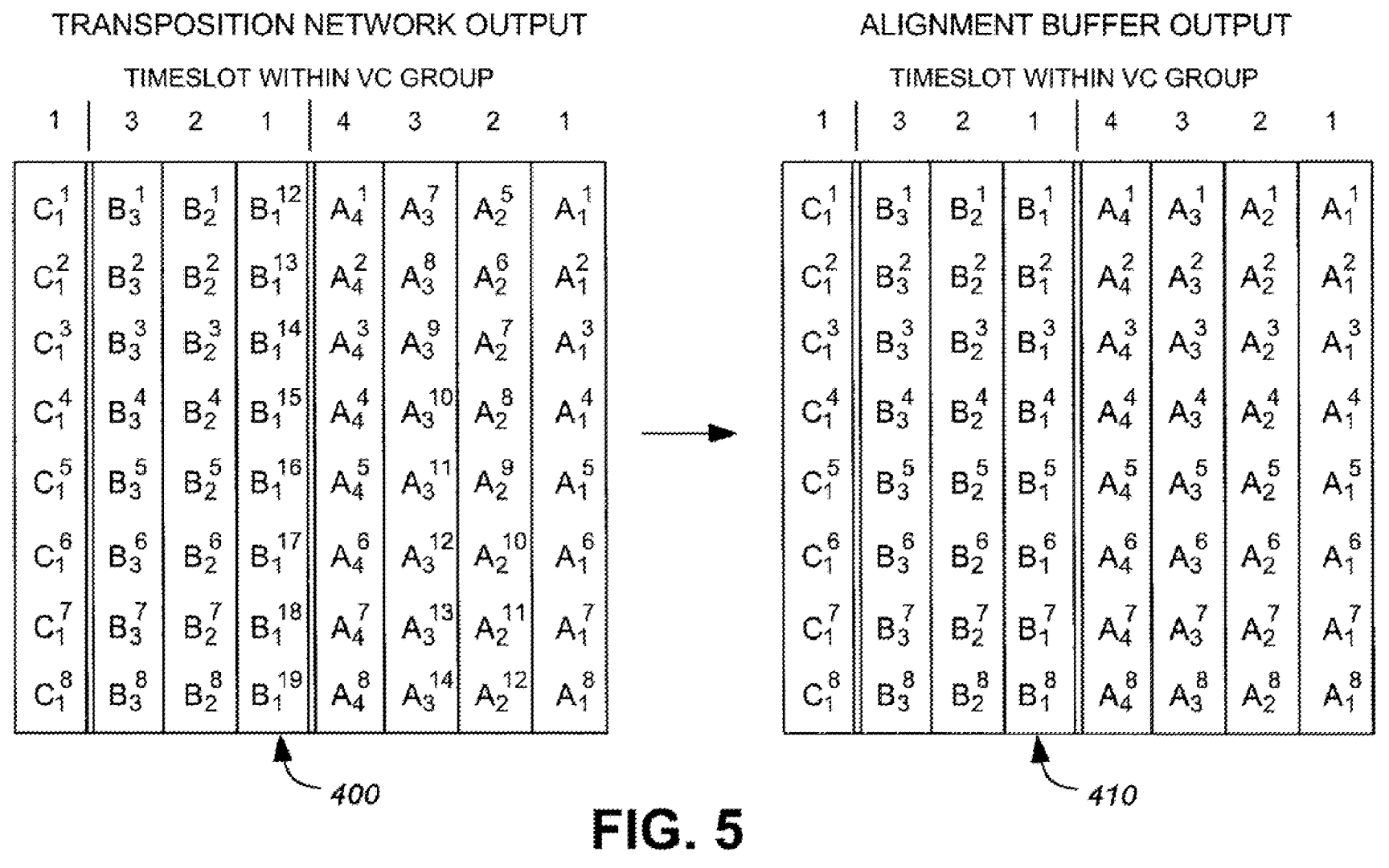

The effect of the transposition function 310 is to convert a mixed stream of timeslot data into a coherent TDM stream of data words, with each word containing consecutive bytes drawn from a single VC sub-frame at a time. Once the input stream has been properly divided into individual sub-frames, the system must then accumulate, shift and align these sub-frames with respect to each other to compensate for the differential delay between sub-frames. This process of time-shifting and aligning is implemented by the combination of the byte aligner 110, alignment buffers 120 and alignment control 125. FIG. 5 illustrates the resultant data matrix from processing the output 400 of the transposition network 100 to the output 410 of the alignment buffers 120.

The alignment buffers 120 are preferably created as logical ring buffers within a single large RAM block. Each logical ring buffer holds consecutive data words drawn from a separate sub-frame stream. The data words from the sub-frame streams are written into the logical ring buffers in serial order, and also read from the logical ring buffers in serial order.

Differential delay compensation is accomplished by offsetting the head pointers, and read pointers, of the individual logical ring buffers with respect to each other. As such, the ring buffers contain more data for sub-frames that arrive earlier, and less data for those arriving later, thereby introducing delays in the opposite direction that cancel out the differential arrival delays. The size of the RAM block, and hence of the logical ring buffers within the RAM block, may be varied as required to compensate for any amount of differential delay.

It should be mentioned that this process could be emulated using normal FIFO structures that are well known in the prior art. The use of logical ring buffers rather than FIFOs, however, obviates the need to fix upon one of the sub-frames as a reference point for measuring the delays with respect to all of the others. Essentially, the size of each logical ring buffer determines the maximum amount of relative delay that can be accommodated for the associated sub-frame, as in the present example an STS-1 sub-frame. The location of the head pointer within each logical ring buffer, relative to the locations of the other head pointers within their logical ring buffers, gives the current relative delay for that STS-1 sub-frame. The addition of another incoming sub-frame with a greater relative delay than all of the others means that its head pointer will be offset ahead of all of the other head pointers. On the other hand, the addition of a new sub-frame with a smaller relative delay than all of the others simply causes its head pointer to be offset behind all of the other head pointers (wrapping within the logical ring buffer if necessary), effectively representing a "negative" offset with respect to the previously smallest head pointer. As long as the logical ring buffers are all of sufficient size, any combination of relative delays can be accommodated.

The use of the alignment buffers 120 in this manner for delay compensation has one drawback—compensation can only be done on a word-by-word basis. This is because the alignment RAM is equal to the datapath in width, and hence adjusting the read address up or down will add or remove delays in units of the datapath width, according to the present invention, 8 bytes. The byte aligner block 110 is used to obtain finer granularity of delay compensation, down to 1-byte increments. The process is performed by shifting each incoming data word for each sub-frame up or down in units of 1 or more bytes. The data words are then truncated and data is stored into the appropriate logical ring buffer within alignment buffer 120. The remaining bytes, past the truncation point, are contained in an accumulator for the next data word from the same sub-frame. A total of S accumulators will be required, where S is the number of sub-frames in the SONET frame, each accumulator being equal in size to the datapath width.

The alignment control unit 125 generates the proper shift amount to the byte aligner 110 and the proper write and read addresses to the buffer RAM within the alignment buffer 120 as required for each STS-1 sub-frame. The alignment control unit 125 generates a new set of control signals for each data word input to the byte aligner 110. In addition, the alignment control unit 125 produces an address sequence to the buffer RAM within alignment buffer 120 as follows:

Write address (Accumulative, scatter):

$$A_i^g = A_i^g + 1$$

Read address (interleaved, block):

$$A_o^g = A_{offset}^g + A_{base}^g + A_{pointer}^g;$$

$$A_{pointer}^g = A_{pointer}^g + 1;$$

where
- $A_i^g$ is the current write address associated with STS-1 sub-frame g;
- $A_o^g$ is the current read address associated with STS-1 sub-frame g;
- $A_{base}^g$ is the starting address of the buffer assigned to STS-1 sub-frame g;
- $A_{offset}^g$ is the offset to compensate the differential delay for STS-1 sub-frame g;
- $A_{pointer}^g$ is the current buffer read pointer for STS-1 sub-frame g;

Multiplying Shifter 130 and STS Index Shifter 140

The multiplying shifter 130 and associated STS index shifter 140 form mapping means 145. The combination of these two shifters, 130 and 140, is used to redistribute the bytes within each data word presented at the output of the alignment buffer 120 such that they may be properly organized within the accumulation buffer 120 and subsequently be output in the desired grouped sets. The organization of data as it proceeds through the two shifters is shown in FIG. 6.

Figure 7:
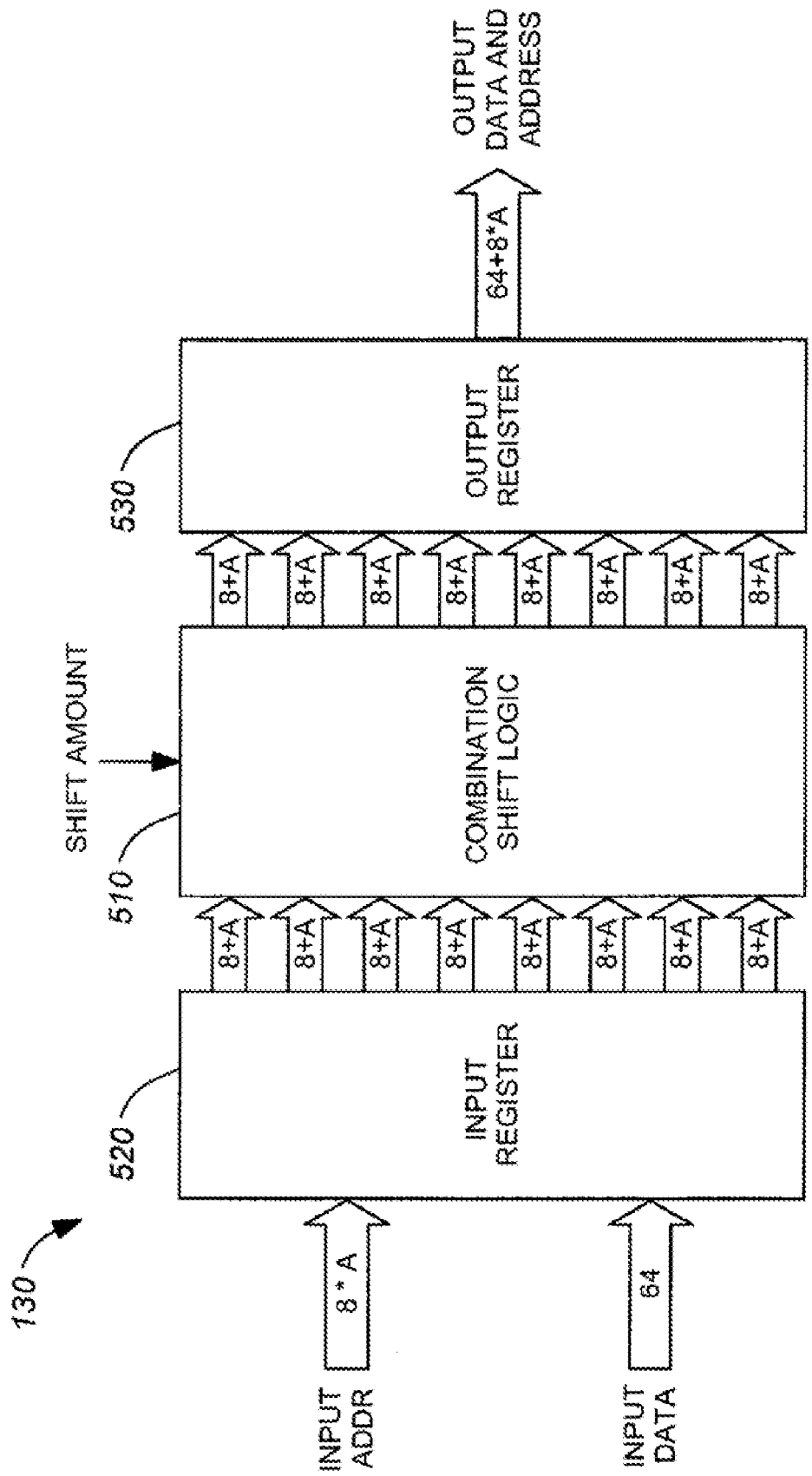
FIG. 7 is a block diagram of the functional elements comprising the multiplying shifter of FIG. 3.

FIG. 7 is a block diagram of the functional elements comprising the multiplying shifter 130. The multiplying shifter 130 consists of a combinatorial shift register 510, coupled between an input shift register 520, and an output shift register 530.

The multiplying shifter 130 provides a special transformation on the incoming data word. For a given shift amount N, each byte of a given data word is shifted by (N*i) positions, where i is the index value of the byte within the word. If (N*i) exceeds the width of the datapath D, the remainder modulo D is taken as the shift amount (i.e., (N*i)/D).

Some conflicts may occur during the shifting process; for instance, with N=4, input byte positions 0 and 2 both map to output byte position 0. Therefore, if ((N*i) modulo D) for a particular value of i conflicts with ((N*j) modulo D) for previous value j<i, then the target byte position for index value i is incremented by 1. As example, the 8-bit datapath transformation is summarized in FIG. 8.

Figure 8:
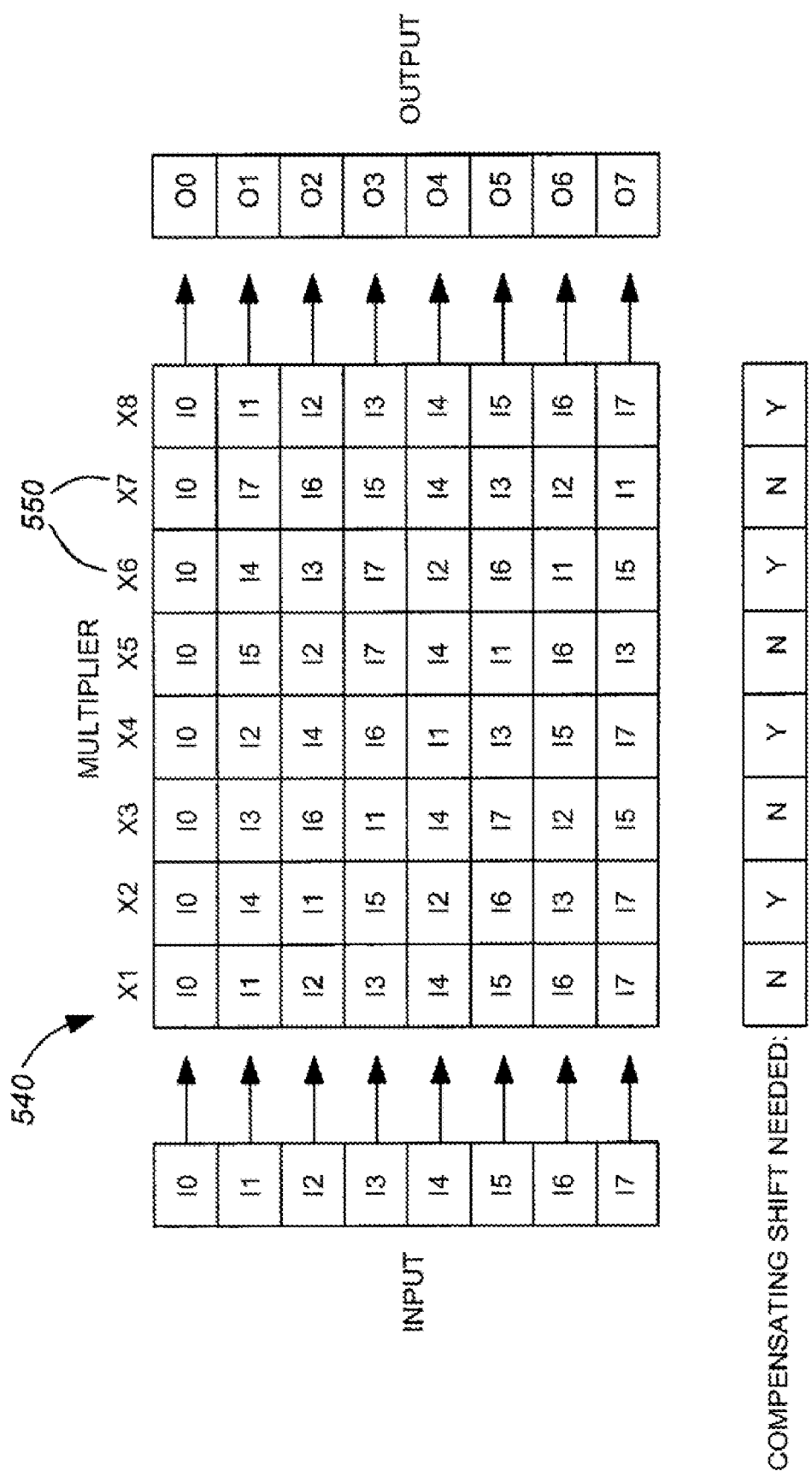
FIG. 8 is a table illustrating the use of combinatorial shift logic to map input bytes to output bytes within the multiplying shifter of FIG. 7.

FIG. 8 is a table 540 illustrating the use of the combinatorial shift logic in order to map input bytes to output bytes for various values of the shift amount. The shift amount is represented as a multiplier 550. A row of flags indicating whether the compensating shifter 160 must apply a shift is also shown in FIG. 8. This table 540 gives the mapping and compensating shift flags for an 8-byte datapath. Similar tables may be easily derived for other datapaths. It is clear that the compensating shift flags are set to shift for even values of the multiplier but to not shift for odd values of the same.

The STS index shifter 140 (FIG. 3) performs a simple shift function on the output of the multiplying shifter 130, wherein the data word presented by the multiplying shifter 130 is shifted to the right (downwards, in the above diagrams) by the index value of the STS-1 sub-frame within the virtual or contiguous concatenation data stream. The first STS-1 sub-frame is assigned an index value of 0. If the index value exceeds the number of bytes in the datapath, then the shift amount is derived by dividing the index value by the number of bytes in the datapath and using the remainder (i.e., the shift amount is the index value of the STS-1 modulo the datapath width in bytes).

The outputs of the write address generator 160A are preferably passed through the multiplying shifter 130 and STS index shifter 140, as will be described below. Essentially, this means that the width of each byte lane processed by the two shifters 130, 140 is increased by the number of bits of address for that byte lane. Thus, if the address generator 160A produces eight 7-bit addresses per cycle, for example, the multiplying shifters 130, 260 (FIG. 2) and STS index shifters 140, 250 are implemented as processing eight 15-bit lanes (8 bits of data and 7 bits of address). The purpose is to ensure that the addresses from the address generator 160A undergo the same mapping and shifting processes as the data from the alignment buffers. As such, a given address field always stays with the corresponding data field, regardless of which lane the data field finally ends up at the output.

It may be observed from FIG. 6 that the combined effect of the multiplying shifter 130 and the STS index shifter 140 is to re-order the bytes within each datapath word such that consecutive bytes in ordinal sequence occupy consecutive locations on the datapath, irrespective of which specific sub-frame these bytes originally were received in. For example, FIG. 6 shows that $A_1^1, A_2^1, A_3^1, A_4^1, A_1^2, A_2^2, A_3^2$ and $A_4^2$ occupy datapath byte lanes 1, 2, 3, 4, 5, 6, 7 and 8, respectively (reading from top to bottom) after the operation of the two shifters 130, 140, and may hence be easily assembled into a single 8-byte data word. However they were received on byte lanes 1 and 2 from the alignment buffer 120, as they belonged to four different STS-1 sub-frames. The task of the two shifters 130, 140 is therefore to rearrange bytes within a word such that the downstream accumulation buffer 150 may place them in the proper order.

Accumulation Buffer 150 and Write Address Generator 160A

The accumulation buffer 150, with the associated write address generator 160A, works in conjunction with the above described mapping means 145 to sort the bytes in each data word. The sorting enables the data words to be positioned into the proper locations to output ordered blocks of data in a contiguous form. The control logic within the accumulation buffer 150 maintains a set of logical buffer areas, one for each virtual or contiguous concatenation data stream. It is well known within the prior art as to how a set of logical buffers may be created using a single data RAM. Data bytes within the words presented by the STS index shifter 140 are written into the appropriate offsets within the logical buffers assigned to the data streams to which those words belong; each byte of each word is written to a different offset. The read side of the accumulation buffer 150, however, is processed in a strictly sequential manner, and on a per-word rather than a per-byte basis. The read functionality of the accumulation buffer 150 is therefore similar to that of a conventional FIFO.

The function is to scatter data on a byte-by-byte basis throughout the accumulation buffer 150 on a write, but to read them out in a linear sequential manner. The scattering of data is done such that after a complete block of words has been written to the corresponding logical buffer, all of the bytes in the block will be placed in proper sequential order. The data will therefore be in the same order in which they were generated before being transmitted using multiple STS-1 sub-frames. To facilitate the scattering of data, the accumulation buffer 150 may preferably be formed from separate RAM banks, each bank being 1 byte wide and assigned to a different byte of the datapath.

Figure 9:
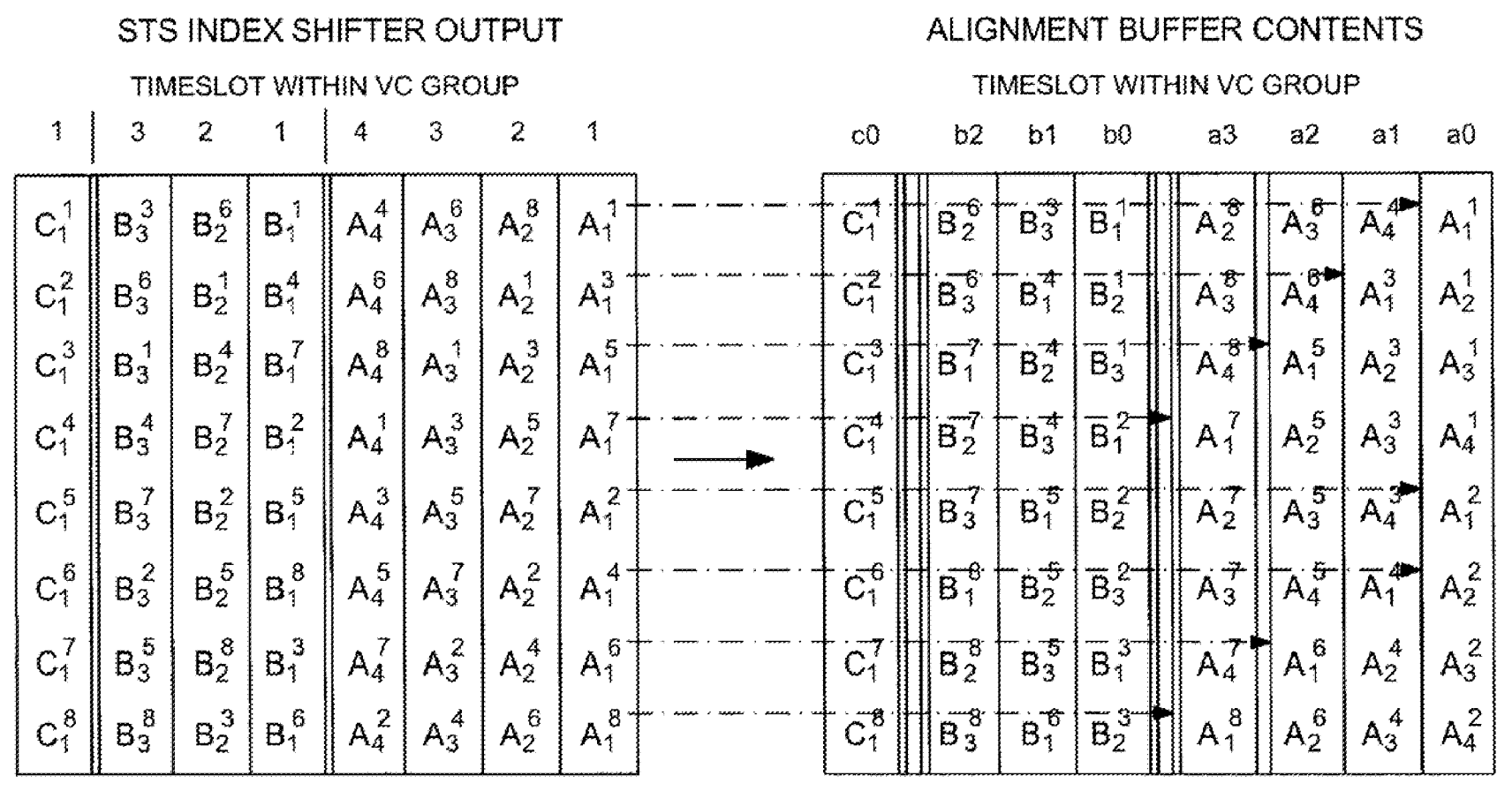

An example is illustrated in FIG. 9 in which the contents of the accumulation buffer 150 contain a complete block of data from a specific concatenation data stream that has been written to the buffer. Each virtual, or contiguous, concatenation stream may be assigned a separate region within the buffer as particular blocks of data. The size of each region is equal to the number of STS-1 sub-frames comprising the data stream multiplied by the width of the datapath in bytes.

In FIG. 9, the function of the mapping means 145 is to place the bytes for each data word in the proper positions within the word such that they will fall into the appropriate locations within the accumulation buffer 150. The mapping means 145 therefore orders the bytes along the vertical axis, while the address generator 160A and accumulation buffer 150 order the bytes along the horizontal axis. The combined effect of these elements will convert a set of incoming data words belonging to different STS-1 sub-frames, in any arrangement of virtually or contiguously concatenated data streams, into coherent blocks within the accumulation buffer 150 with the bytes placed in the proper order. Once these blocks are formed, they can be read out at will and processed using normal processing means at high speed.

The write address generator 160A is responsible for producing the offset address for each byte of data written to the accumulation buffer 150, such that the byte is steered to the proper location within the accumulation buffer 150 as part of the block-forming process. This unit contains sequencing logic that tracks the association between data words being read out of the alignment buffers, and the virtual or contiguous concatenation data streams to which they belong plus the index value of the corresponding STS-1 sub-frame within the data stream. This information is then used to compute the offset addresses required for the different data bytes as they are written into the accumulation buffer 150. The address generation performed by write address generator 160A is done according to the following process:

Write address (distributive):

$$A_i^{b,w} = \text{INT}(((b_i * \text{NCHAN}) + w_l)/D);$$

where $A_i^{b,w}$ is the address offset into the accumulation buffer 150 in cycle i for byte b of word w;

$b_i$, is the numeric index value within the current word of byte b;

NCHAN is the number of STS-1 sub-frames forming the concatenated data stream;

$w_l$ is the numeric index value of the STS-1 sub-frame to which the current word belongs; and D is the width of the datapath in bytes.

In the above formula, INT(x) refers to the truncation operator, i.e., the process of rounding down the value x to the nearest integer less than x.

As each virtual or contiguous concatenation data stream is assigned to a different region within the accumulation buffer 150, the write address offsets computed by the above process are added to the base (or starting) address of the region for the corresponding data stream. The resulting set of D addresses (in this case, eight, as the datapath is 8 bytes wide) is passed through the multiplying and STS index shifters 130 and 140, and then used to control the write address inputs of the DRAM banks comprising the accumulation buffers 150. In the example being used herein, the address offsets after passing through the two shifters 130, 140 is:

| Address Generator Outputs | | | | | | | |
|---|---|---|---|---|---|---|---|
| 0 | 1 | 2 | 0 | 1 | 2 | 3 | 0 |
| 0 | 2 | 0 | 1 | 2 | 3 | 0 | 1 |
| 0 | 0 | 1 | 2 | 3 | 0 | 1 | 2 |
| 0 | 1 | 2 | 0 | 0 | 1 | 2 | 3 |
| 0 | 2 | 0 | 1 | 1 | 2 | 3 | 0 |
| 0 | 0 | 1 | 2 | 2 | 3 | 0 | 1 |
| 0 | 1 | 2 | 0 | 3 | 0 | 1 | 2 |
| 0 | 2 | 0 | 1 | 0 | 1 | 2 | 3 |

As the blocks are formed in a coherent and byte-sequential manner, a given data block must be completely formed before reading the contents of the block, word-by-word, out of the accumulation buffer 150. A sequential addressing system is sufficient to read out the blocks. To simplify the process of reading blocks while incoming data are being written to the accumulation buffer 150, it is preferable to maintain two sets of regions within the accumulation buffer 150 for each data stream. The system then switches between the two regions in a standard double-buffered fashion.

Compensating Shifter 160

Figure 10:
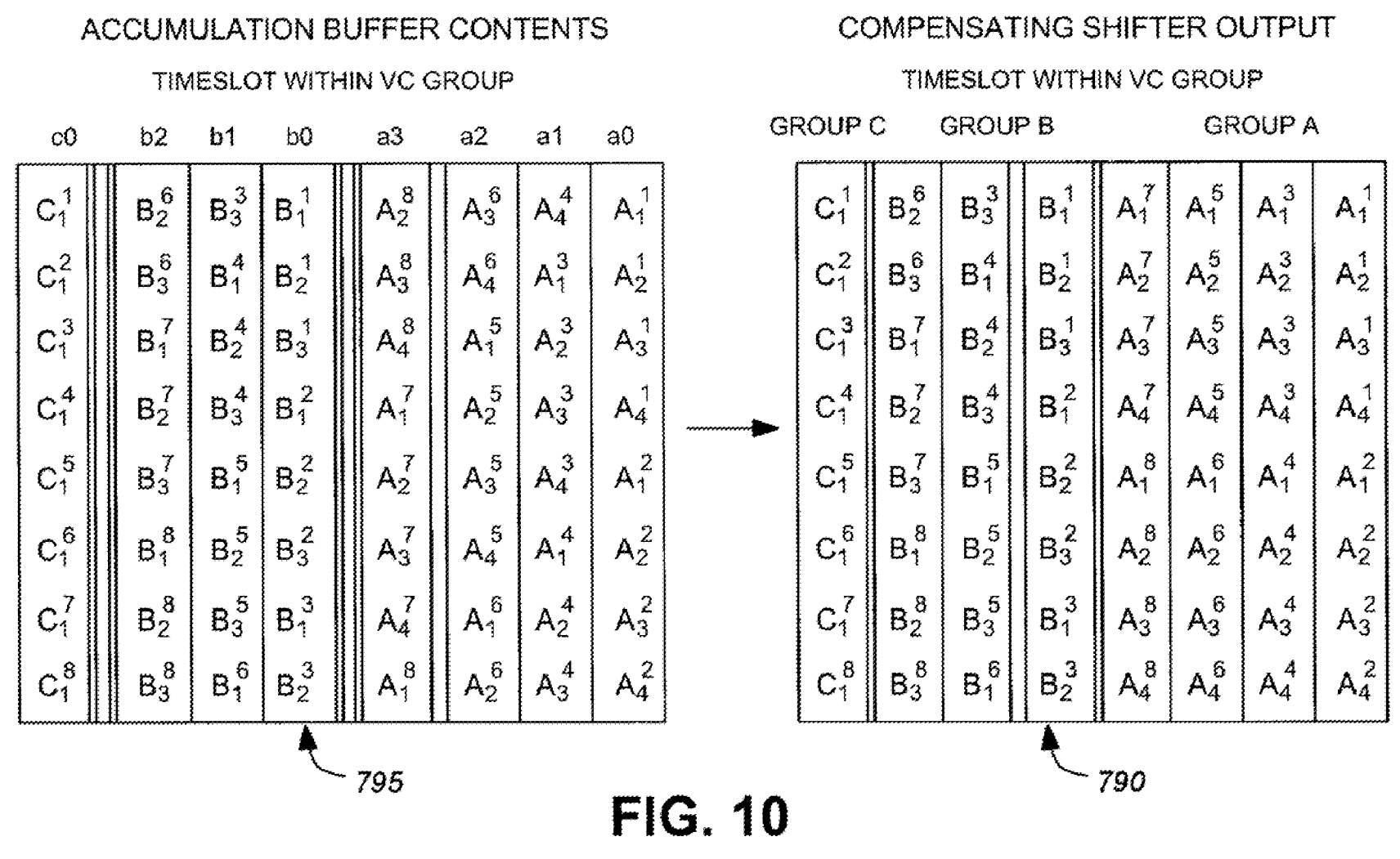

The compensating shifter 160 performs a final rotation operation on the data words within the blocks created in the accumulation buffer 150. An observation of the accumulation buffer contents in the preceding example (in the section above) will show that when the number of STS-1 sub-frames comprising a concatenated data stream is even, then the process of shifting and accumulating will skew (offset) the data within the corresponding block in the accumulation buffer 150 by a predictable amount. The purpose of the compensating shifter 160 is to eliminate the skew by rotating data words read out of the accumulation buffer 150 in the opposite direction. The compensating shifter 160 output 790, derived from the accumulation buffer contents 795, is shown in FIG. 10. Thus, in the example provided in FIG. 10, the accumulation buffer contents 795 for blocks B and C are not shifted, as the number of STS-1 sub-frames is odd, but the contents for block A must be rotated up by 1 position for every successive data word in order to align the data words properly.

The compensating shifter 160 is constructed using a barrel rotator and some control logic that determines whether, and how much, the data should be shifted. The control logic tracks the number of STS-1 sub-frames associated with a given block, and also the index value of the data word that is currently being read from the block, and computes the proper shift amount to supply to the barrel rotator. All rotations are performed from most-significant to least-significant byte of the datapath.

The shift amount is computed by the following process:

1. Let NCHAN be the number of STS-1 sub-frames associated with the data stream for the given block, and let D be the width of the datapath in bytes. Note that NCHAN must be a multiple of 2 (i.e., even) as odd values of NCHAN have no shifts required 2. Compute Q=(NCHAN/D).

3. Let F be the fractional part of Q. F must be either 0, 0.25, 0.5 or 0.75. If F is 0.25 or 0.75, set STEP=Q/0.25; else if F is 0.5, set STEP=Q/0.5; else set STEP=Q.

4. Set the initial shift amount to 0.

5. After STEP words have passed through the compensating shifter 160, increment the shift amount by 1.

6. Repeat 5-6 until the entire block has been read out. Restart from 1 for each new block.

The above process yields a sequence of shift values in the form 0, 0, 0, . . . 0, 1, 1, 1, . . . 1, 2, 2, 2, . . . 2, . . . that determine the rotation amount to be applied by the compensating shifter 160. For a datapath width of 8, table 3 below gives various sequences of shift values computed by the process.

TABLE 3

| NCHAN | Block size, words | Sequence of shift values |
|---|---|---|
| 2 | 2 | 0, 1 |
| 4 | 4 | 0, 1, 2, 3 |
| 6 | 6 | 0, 0, 0, 1, 1, 1 |
| 8 | 8 | 0, 1, 2, 3, 4, 5, 6, 7 |
| 10 | 10 | 0, 0, 0, 0, 0, 1, 1, 1, 1, 1 |
| 12 | 12 | 0, 0, 0, 1, 1, 1, 2, 2, 2, 3, 3, 3 |
| 16 | 16 | 0, 0, 1, 1, 2, 2, 3, 3, 4, 4, 5, 5, 6, 6, 7, 7 |
| 18 | 18 | 0, 0, 0, 0, 0, 0, 0, 0, 0, 1, 1, 1, 1, 1, 1, 1, 1, 1 |

It is understood that the shift sequences to be used by other datapath widths may easily be calculated using the process described above.

Data Packer 160 and Output FIFO Buffers 180

As mentioned previously, the STS-1 sub-frames being processed by the datapath will contain gaps or "holes" in the data due to deleted SONET overhead bytes, as well as due to pointer adjustments for clock synchronization. These holes must be removed in order to present continuous streams of data to the system-side processing units. The holes are most easily removed in the last stage of the datapath, after the data have been packed into blocks according to the virtual/contiguous concatenation setup; this permits a simple packing operation to be performed on the coherent data, and avoids the complex shifting and merging functions that would otherwise have to be performed upon the incoming data in order to properly eliminate holes.

The removal of holes is accomplished by the packer 170 and output FIFO buffer blocks 180 at the last stage of the receive datapath 50A. To facilitate the task, byte-valid signals are preferably provided by the SONET framer 70 feeding the datapath; each byte-valid signal is associated with a different byte lane of the datapath, and indicates whether the byte lane contains a valid byte, or a hole that must be filled, during each clock cycle. These byte-valid signals are passed through the datapath, being processed identically to the data bytes themselves (i.e., a byte-valid signal and the associated data byte are processed as a single unit). The packer 170 may then use the byte-valid signals to determine the gaps in the incoming data and fill them.

The packer 170 consists of N accumulator registers (N being the number of data streams), each D bytes in size (where D is the width of the datapath in bytes), together with a barrel shifter and some control logic. Each accumulator register is associated with a particular virtual/contiguous data stream. When a data word is presented to the packer 170, it determines whether there are any gaps present. If any gaps are present, the barrel shifter is used to rotate the data to eliminate the gap. The packed data word is further rotated and combined with any data already stored in the accumulator for that particular data stream. If the resulting data word is >=D bytes in size, the packer 170 removes the lower D bytes of this result and sends them on to the output FIFO buffer 180, and stores the remainder in the accumulator for the next set of data for that data stream. Otherwise, the packer 170 stores the resulting data word in the accumulator for use during the next cycle.

The output FIFO buffer 180 is an optional feature of the present invention that serves to simplify the task of the downstream processing units by buffering data produced by the datapath and then allowing the downstream units to read out the data in any desired burst size. The output FIFO therefore decouples the downstream processing entities from the fixed sequence in which the virtual concatenation receive datapath produces this data. This FIFO is not required if the downstream processing units can handle the data sequence followed by the receive datapath.

While the detailed description of the barrel shifter and accumulator are not provided herein, it is assumed that the above description is sufficient to permit a person skilled in the art to implement the required accumulation and packing functionality.

Virtual Concatenation Transmit Datapath 50B

Figure 11:
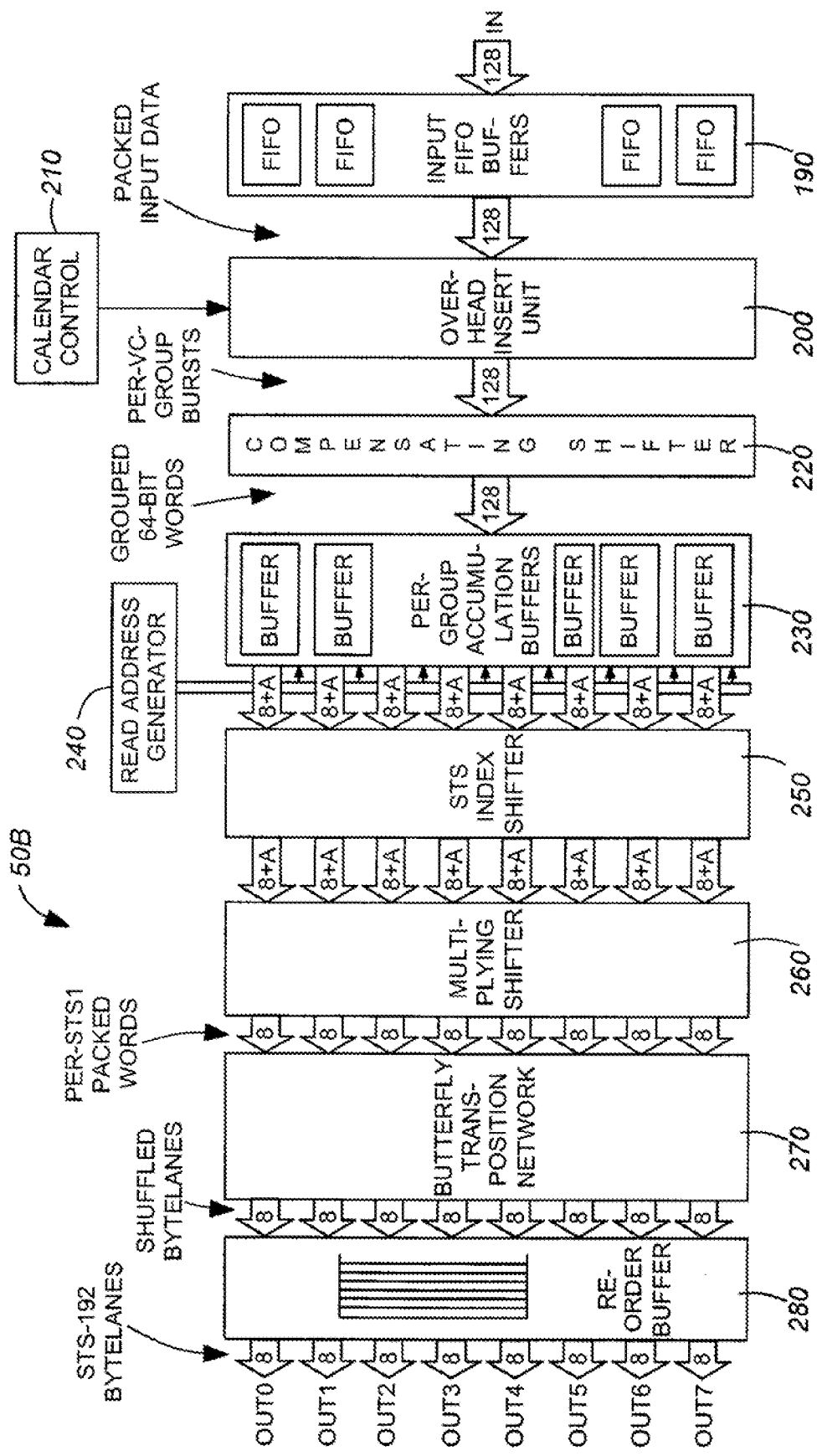
FIG. 11 is a schematic representation of the elements in a transmit datapath of FIG. 2.

The transmit datapath 50B contains similar elements used by the receive datapath 50A, but differs primarily in that the flow of data takes the opposite direction. A schematic diagram of the transmit datapath 50B is illustrated in FIG. 11. The operation of the input FIFO buffers 190, compensating shifter 220, accumulation buffers 230, STS index shifter 250, multiplying shifter 260, transposition network 270 and re-order buffer 280 are identical to the units of the same name in the receive datapath 50A, with the exception that they perform a mirror image function. For instance, the multiplying shifter 260 in the transmit datapath 50B utilizes the same mapping process between inputs and output as the multiplying shifter 130 in the receive datapath 50A, but in mirror fashion. Therefore, these units will not be described any further. It is assumed that one skilled in the art will be able to design the elements of the transmit datapath 50B, given the description of the corresponding units in the receive datapath 50A.

In FIG. 11, the read address generator 240 functions similarly to the write address generator 160A in the receive datapath 50A, but produces a set of per-byte read addresses rather than write addresses. The address sequence sent to the accumulation buffers 230 is the same as the address sequence at the same point in the read datapath 50A. Effectively, therefore, the read address generator 240 contains the identical functionality as the write address generator 160A in receive datapath 50A, plus a multiplying shifter 260 and STS index shifter 250 to swizzle the addresses appropriately to obtain the proper sequence of addresses at the accumulation buffers 230.

According to FIG. 11, the overhead insert unit 200 and associated calendar control 210 does not form part of the receive datapath 50A, and will hence be described in detail. The overhead insert unit 200 performs a complementary function to the packer unit 170 in the read datapath 50A. Similar to the packer unit 170 having identified and removed SONET overhead bytes in the incoming data stream and packed the remaining data to eliminate gaps, the overhead insert unit 200 inserts SONET overhead bytes into the outgoing data stream, while shifting and accumulating data as required in order to make room for the inserted bytes.

The overhead insert unit 200 consists of a set of N accumulator registers (not shown, but functioning identically to the N accumulator registers in the packer unit 170) and a barrel shifter unit that can shift subsets of the bytes within each word to make room for injected overhead bytes. In this case, N is the number of virtual/contiguous concatenated data streams. When overhead bytes are to be inserted, the overhead insert unit 200 adds any residual bytes in the proper accumulator to the data from the input FIFO buffer 190, shifts the bytes in the word apart to make room for the new bytes and inserts blank byte locations (preferably indicated by a special per-byte valid flag) into the space thus created. The result is divided into a portion of D bytes (where D is the width of the datapath in bytes) that is sent down the datapath for further processing, and a remainder that is stored in the appropriate accumulator register for future use. This process continues as long as SONET frames are being generated.

The calendar control unit 210 is responsible for determining the locations into which overhead bytes must be inserted, and also for generating the proper sequence of read commands to the input FIFO unit 190 in order to cause it to output the frame payload. Essentially, the calendar control unit 210 creates the skeleton SONET frame around the payload that is being supplied from the input FIFO buffers 190. The calendar control unit 210 further tracks the effective location of each word read from the input FIFO buffers 190 within this skeleton SONET frame, computes the locations into which overhead is expected to be inserted, and instructs the overhead insert unit 200 to actually insert dummy (empty) bytes at these positions.

The calendar control unit 210 consists of a simple counter means that counts over the byte locations within the two-dimensional SONET frame, and a configuration memory that indicates where each byte is expected to be obtained from (i.e., inserted overhead, or data from a specific virtual or contiguous concatenation data stream). It should be mentioned that the combination of the two elements forms a programmable state machine, which is constructed in a manner well known in the prior art. In operation, the counter sequences through the byte locations in the SONET frame. For each byte location, the configuration memory within the control unit 210 provides a data read indication to the input FIFO unit 190, denoting the data stream for which data must be read, and a set of overhead byte location indicators to the overhead insert unit 200. The overhead insert unit 200 accepts the data from the input FIFO unit 190 and the overhead byte locations from the calendar control unit 210, and outputs the proper data on its output bus. Residual data are held in accumulator registers for use in a subsequent cycle.

Configuration and Control

The transmit and receive datapaths 50A, 50B must be properly configured to process the required arrangement of STS-1 (or higher-order) sub-frames that comprise the virtually and contiguously concatenated data streams. In addition, dynamic changing of the incoming or outgoing frame structure will necessitate control of the parameters supplied to the datapaths. This configuration and control function is rendered simple in the present invention due to the fact that very simple and straightforward address generation and shift control algorithms are sufficient for accommodating even very complex SONET frame structures. These algorithms have been provided wherever necessary during the description herein of the individual sub-blocks comprising the datapath. No configuration and control functionality is required beyond this.

Figure 12:
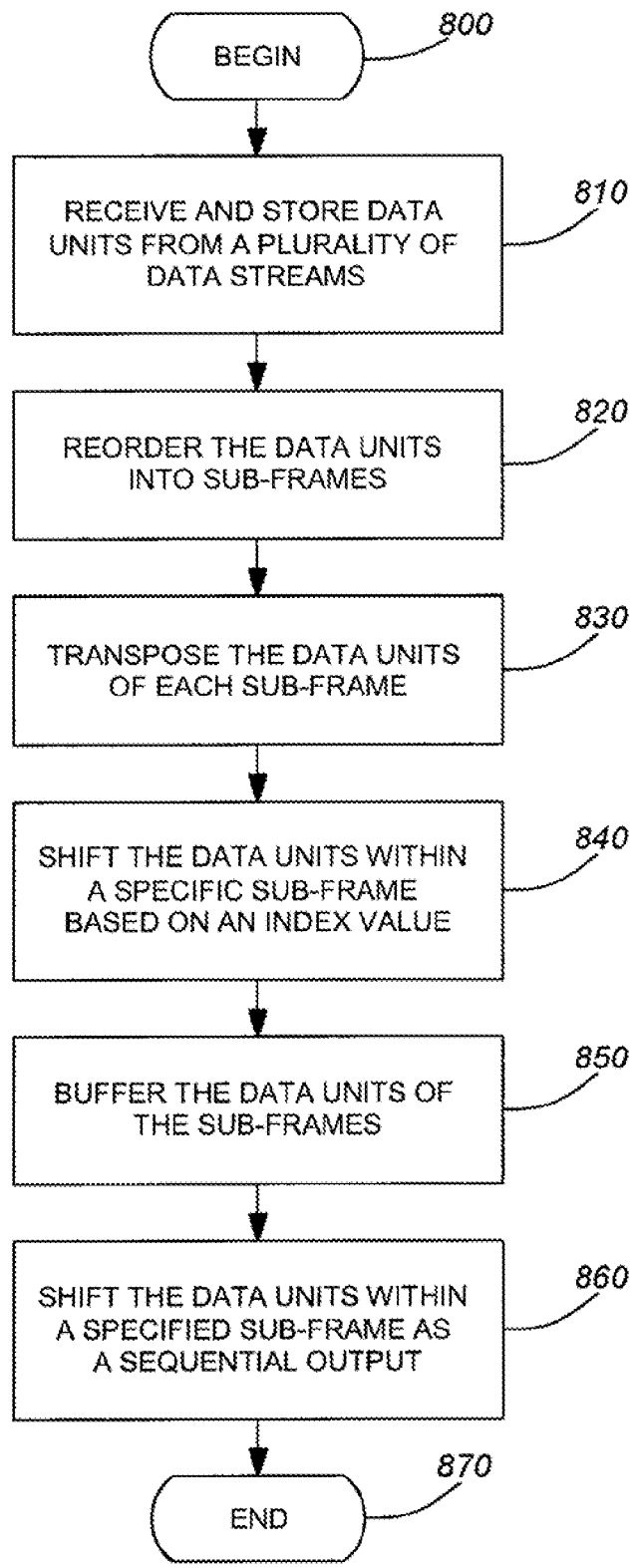
FIG. 12 is a flowchart detailing the steps in a method for processing a plurality of streams of concatenated data in accordance with the present invention.

Essentially, the SONET virtual concatenation payload processing mechanism of the present invention may be characterized by a general system process. FIG. 12 is a flowchart detailing the steps in a method for processing a plurality of streams of virtually or contiguously concatenated data. The process begins at step 800 and is followed by a step 810 to receive and store data words comprising a plurality of data streams. In a next step 820, the system re-orders the data words with respect to the STS-1 sub-frames in order to ensure that each word on the datapath is drawn from only one STS-1 sub-frame. In step 830, a mapping function is applied to each data word of each STS-1 sub-frame to transpose specific bytes within each sub-frame to prepare them for the index shifting operation. The system, in step 840, shifts the data units within a specific word based on a pre-configured index value corresponding to the sub-frame index within the virtual or contiguous concatenation stream. In a next step 850, the properly shifted data words belonging to particular sub-frames are buffered and accumulated until complete data blocks are available. Finally, in step 860, the system shifts the data units within a specified sub-frame as a sequential output. The process ends at step 870.

Figure 13:
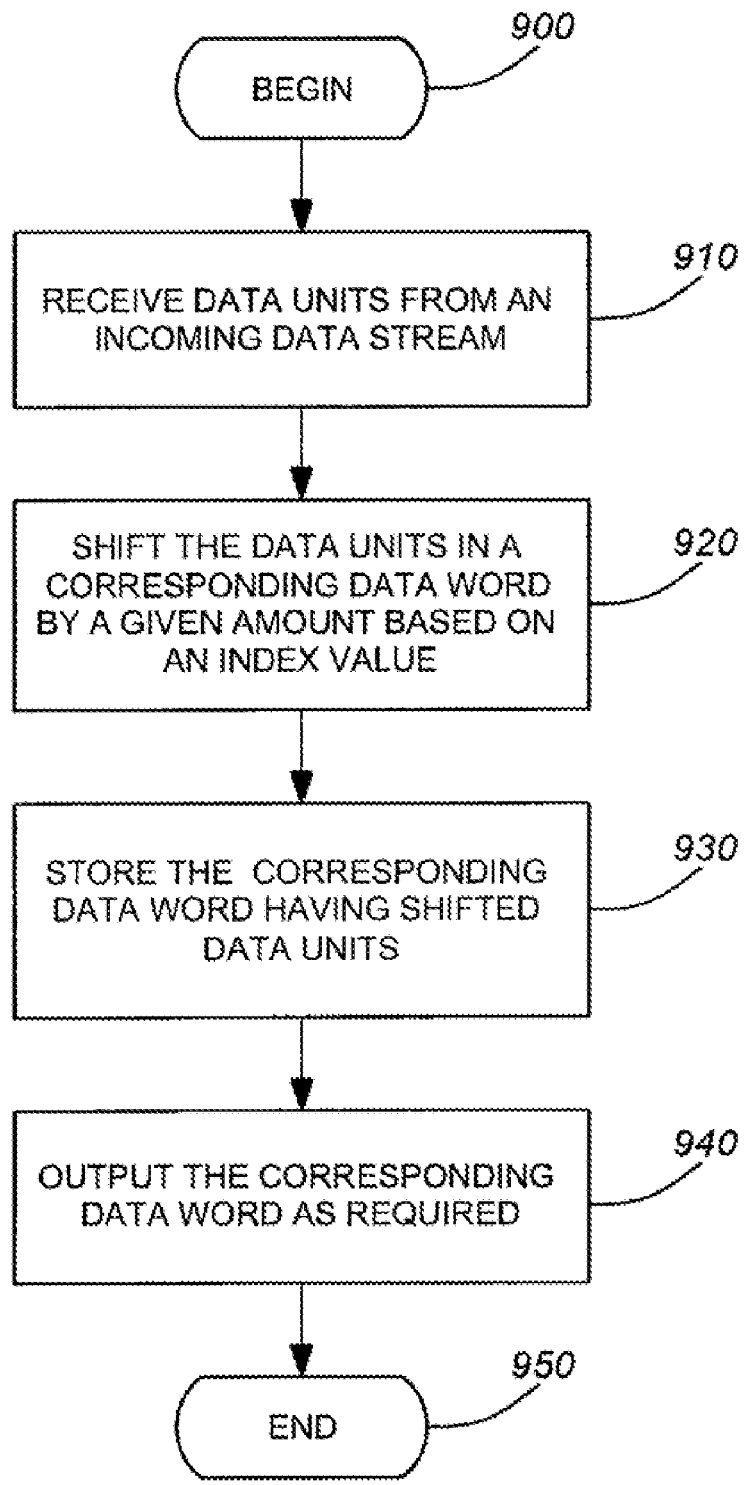
FIG. 13 is a flowchart detailing the steps in a method of mapping specific data units onto specific data output portions within the multiplying shifter according to the present invention.

FIG. 13 is a flowchart detailing the steps in a method of mapping specific data units onto specific data output portions in a data word. The process begins at step 900 and is followed by step 910, where a mapping device receives data units from an incoming data stream. In a next step 920, the mapping device shifts the data units in a corresponding data word by a given amount. This given amount, in step 920, already explained in the context of the mapping means of FIG. 7, is based on an index value. In a further step 930, the corresponding data word, shifted in step 920, is stored. As required by the output of the mapping system, the corresponding data word is output. The process ends at step 950.

A person understanding the above-described invention may now conceive of alternative designs, using the principles described herein. All such designs that fall within the scope of the claims appended hereto are considered to be part of the present invention.

What is claimed is:

1. A method of mapping discrete data units sequentially located within a mapper input data word onto predetermined discrete data units non-sequentially located within a mapper output data word based on a specific index, the method including the steps of:

accepting the discrete data units within the mapper input data word;

shifting each of the discrete data units within the mapper input data word by a shift amount, the shift amount being based on the specific index value associated with the mapper input data word accepted in the accepting step;

generating an address associated with each of the discrete data units, and shifting the address using the same shift amount as the discrete data unit; and storing as the mapper output data word the set of discrete data units shifted in the shifting step, the shift amount for each of the discrete data units within the mapper input data word being determined by the equations:

$$(N*i) \mod D, \text{ for } (N*i) > D$$

$$(N*i), \text{ for } (N*i) <= D$$

where N is the specific index, i is the index of the discrete data unit in the mapper input data word, and D is the total number of the discrete data units in the mapper output data word, such that if one of the discrete data units maps onto a position within the mapper output data word that has been previously mapped, the data unit is instead mapped onto a next sequentially available output position.

2. The method as claimed in claim 1, further including processing of a plurality of data streams, each data stream including a plurality of discrete data units, each data unit including a portion of a data sub-frame, each data sub-frame including a portion of a data frame, and the method further including the steps of:
   receiving the plurality of data streams, and
   reordering the discrete data units contained in the data streams according to the data sub-frames to form the mapper input data words, such that each of the mapper input data words contains discrete data units from only one of the data sub-frames.

3. The method as claimed in claim 2, further including the step of producing index-shifted mapper output data words, by shifting each of the mapper output data words by a shift amount equal to the index of the data sub-frame of which the mapper output data word forms a part.

4. The method as claimed in claim 3, further including the step of accumulating the index-shifted mapper output data words within an accumulation buffer.

5. The method as claimed in claim 4, wherein the data frames are SONET/SDH frames.

6. The method as claimed in claim 5, wherein the data sub-frames are virtually concatenated or contiguously concatenated.

7. The method as claimed in claim 4, further including the step of removing gaps in the accumulated data words.

8. The method as claimed in claim 7, wherein the data frames are SONET/SDH frames.

9. The method as claimed in claim 8, wherein the data sub-frames are virtually concatenated or contiguously concatenated.

10. The method as claimed in claim 3, further including the step of time-shifting and aligning the mapper input data words to compensate for differential time delays imposed upon the data sub-frame from which the mapper input data words are drawn.

11. The method as claimed in claim 10, wherein the data frames are SONET/SDH frames.

12. The method as claimed in claim 11, wherein the data sub-frames are virtually concatenated or contiguously concatenated.

13. A method of forming a data frame, each data frame including a plurality of data sub-frames, each data sub-frame having a plurality of discrete data units, each data unit being associated with a particular one of a plurality of data streams, the method comprising the steps of:
   receiving the plurality of data streams;
   forming the discrete data units comprising the data streams into mapper input data words;
   mapping discrete data units sequentially located within a mapper input data word onto predetermined discrete data units non-sequentially located within a mapper output data word based on a specific index; and
   reordering the mapper output data words according to the data sub-frames in order to form the data frames,
   wherein the step of mapping includes:
      accepting the discrete data units within the mapper input data words;
      shifting each of the discrete data units within the mapper input data words by a shift amount the shift amount being based on the specific index value associated with the mapper input data words; and
      storing as the mapper output data word the shifted set of discrete data units, and
   wherein the shift amount for each of the discrete data units within the mapper input data word is determined by the equations:

$$(N*i) \mod D, \text{ for } (N*i) > D$$

$$(N*i), \text{ for } (N*i) <= D$$

where N is the specific index, i is the index of the discrete data unit in the mapper input data word, and D is the total number of the discrete data units in the mapper output data word, such that if one of the discrete data units maps onto a position within the mapper output data word that has been previously mapped, the data unit is instead mapped onto a next sequentially available output position.

14. The method as claimed in claim 13, further including the step of inserting overhead information into each of the plurality of sub-frames.

15. An apparatus for mapping discrete data units sequentially located within a mapper input data word onto predetermined discrete data units non-sequentially located within a mapper output data word based on a specific index, the apparatus comprising:
   an input means for accepting the discrete data units within the mapper input data word;
   a shifting means for shifting each of the discrete data units within the mapper input data word by a shift amount, the shift amount being based on the specific index value associated with the mapper input data word;
   a means for generating an address associated with each of the discrete data units, and a means for shifting the address using the same shift amount as the discrete data unit; and
   an output register means for storing a mapper output data word from the shifting means,
   the shift amount for each of the discrete data units within the mapper input data word being determined by the equations:

$$(N*i) \mod D, \text{ for } (N*i) > D$$

$$(N*i), \text{ for } (N*i) <= D$$

where N is the specific index, i is the index of the discrete data unit in the mapper input data word, and D is the total number of the discrete data units in the mapper output data word, such that if one of the discrete data units maps onto a position within the mapper output data word that has been previously mapped, the data unit is instead mapped onto a next sequentially available output position.

16. The apparatus as claimed in claim 15, further including processing of a plurality of data streams, each data stream including a plurality of discrete data units, each data unit including a portion of a data sub-frame, each data sub-frame including a portion of a data frame, and the apparatus further including:
   a means for receiving the plurality of data streams, and
   a means for reordering the discrete data units contained in the data streams according to the data sub-frames to form the mapper input data words, such that each of the mapper input data words contains discrete data units from only one of the data sub-frames.

17. The apparatus as claimed in claim 16, further including a means for producing index-shifted mapper output data words by shifting each of the mapper output data words by a shift amount equal to the index of the data sub-frame of which the mapper output data word forms a part.

18. The apparatus as claimed in claim 17, further including a means for accumulating the index-shifted mapper output data words within an accumulation buffer.

19. The apparatus as claimed in claim 18, wherein the data frames are SONET/SDH frames.

20. The apparatus as claimed in claim 19, wherein the data sub-frames are virtually concatenated or contiguously concatenated.

21. The apparatus as claimed in claim 18, further including a packer and an output First-In-First-Out buffer means, whereby gaps in the accumulated data are removable.

22. The apparatus as claimed in claim 21, wherein the data frames are SONET/SDH frames.

23. The apparatus as claimed in claim 22, wherein the data sub-frames are virtually concatenated or contiguously concatenated.

24. The apparatus as claimed in claim 18, further including a plurality of said accumulation buffers, wherein each accumulation buffer is used to accumulate data from the index-shifted mapper output data words corresponding to a specific plurality of said data sub-frames.

25. The apparatus as claimed in claim 24, further including a packer means and a plurality of output First-In-First-Out buffer means, each of the output First-In-First-Out buffer means being associated with the specific plurality of the data sub-frames, whereby gaps in the accumulated data are removable.

26. The apparatus as claimed in claim 25, wherein the data frames are SONET/SDH frames.

27. The apparatus as claimed in claim 26, wherein the data sub-frames are virtually concatenated or contiguously concatenated.

28. The apparatus as claimed in claim 17, further including a means for time-shifting and aligning the mapper input data words to compensate for differential time delays imposed upon the data sub-frame from which the mapper input data words are drawn.

29. The apparatus as claimed in claim 28, wherein the data frames are SONET/SDH frames.

30. The apparatus as claimed in claim 29, wherein the data sub-frames are virtually concatenated or contiguously concatenated.

31. An apparatus for forming a data frame, each data frame including a plurality of data sub-frames, each data sub-frame having a plurality of discrete data units, each data unit being associated with a particular one of a plurality of data streams, the apparatus comprising:

a means for receiving the plurality of data streams;

a means for forming the discrete data units comprising the data streams into mapper input data words;

a means for mapping discrete data units sequentially located within a mapper input data word onto predetermined discrete data units non-sequentially located within a mapper output data word based on a specific index; and a means for reordering the mapper output data words according to the data sub-frames in order to form the data frames, wherein the means for mapping includes, a means for accepting the discrete data units within the mapper input data words, a means for shifting each of the discrete data units within the mapper input data words by a shift amount, the shift amount being based on the specific index value associated with the mapper input data words, and a means for storing as the mapper output data word the shifted set of discrete data units, and wherein the shift amount for each of the discrete data units within the mapper input data word is determined by the equations:

$$(N*i) \bmod D, \text{ for } (N*i) > D$$

$$(N*i), \text{ for } (N*i) <= D$$

where N is the specific index, i is the index of the discrete data unit in the mapper input data word, and D is the total number of the discrete data units in the mapper output data word, such that if one of the discrete data units maps onto a position within the mapper output data word that has been previously mapped, the data unit is instead mapped onto a next sequentially available output position.

32. The apparatus as claimed in claim 31, further including a means for inserting overhead information into each of the plurality of sub-frames.

* * * * *